(12) United States Patent
Sugita

(10) Patent No.: US 7,426,080 B2
(45) Date of Patent: Sep. 16, 2008

(54) ZOOM LENS AND IMAGE PROJECTION APPARATUS HAVING THE SAME

(75) Inventor: Shigenobu Sugita, Utsunomiya (JP)

(73) Assignee: Canon Kabushiki Kaisha, Tokyo (JP)

(\*) Notice: Subject to any disclaimer, the term of this patent is extended or adjusted under 35 U.S.C. 154(b) by 79 days.

(21) Appl. No.: 11/673,798

(22) Filed: Feb. 12, 2007

(65) Prior Publication Data
US 2007/0195427 A1    Aug. 23, 2007

(30) Foreign Application Priority Data
Feb. 23, 2006  (JP) .............................. 2006-046646

(51) Int. Cl.
*G02B 15/14* (2006.01)
(52) U.S. Cl. ...................... 359/676; 359/680
(58) Field of Classification Search ................ 359/676, 359/680, 681, 682, 683
See application file for complete search history.

(56) References Cited

U.S. PATENT DOCUMENTS

| | | | |
|---|---|---|---|
| 6,816,320 B2 | 11/2004 | Wada | |
| 7,016,118 B2 | 3/2006 | Wada | |
| 7,193,789 B2 * | 3/2007 | Maetaki | 359/687 |
| 7,382,550 B2 * | 6/2008 | Nishimura | 359/686 |

FOREIGN PATENT DOCUMENTS

| | | |
|---|---|---|
| JP | 2004-054021 A | 2/2004 |
| JP | 2005-062225 A | 3/2005 |

\* cited by examiner

*Primary Examiner*—Scott J Sugarman
(74) *Attorney, Agent, or Firm*—Canon U.S.A. Inc., IP Division

(57) ABSTRACT

At least one exemplary embodiment is directed to a zoom lens comprising a plurality of lens units, where the plurality of lens units have at least one negative lens including a first negative lens Gn1 arranged at a position where an effective diameter is minimized among negative lenses of the zoom lens, where when the at least one negative lens is represented by an $i^{th}$ negative lens Gni indicating the $i^{th}$ negative lens from an expansion side toward the reduction side and $Xi = \theta gFni - (0.6438 - 0.001682 \times vdni)$, the following condition is satisfied:

$(\Sigma Xi \times fni)/(\Sigma fni) < -0.003,$ where the Abbe number and the partial dispersion ratio of the material of the $i^{th}$ negative lens Gni are $vdni$ and $\theta gFni$, respectively, and the focal length of the $i^{th}$ negative lens Gni is $fni$.

15 Claims, 16 Drawing Sheets

FIG. 7A WIDE-ANGLE END
FIG. 7B TELEPHOTO END

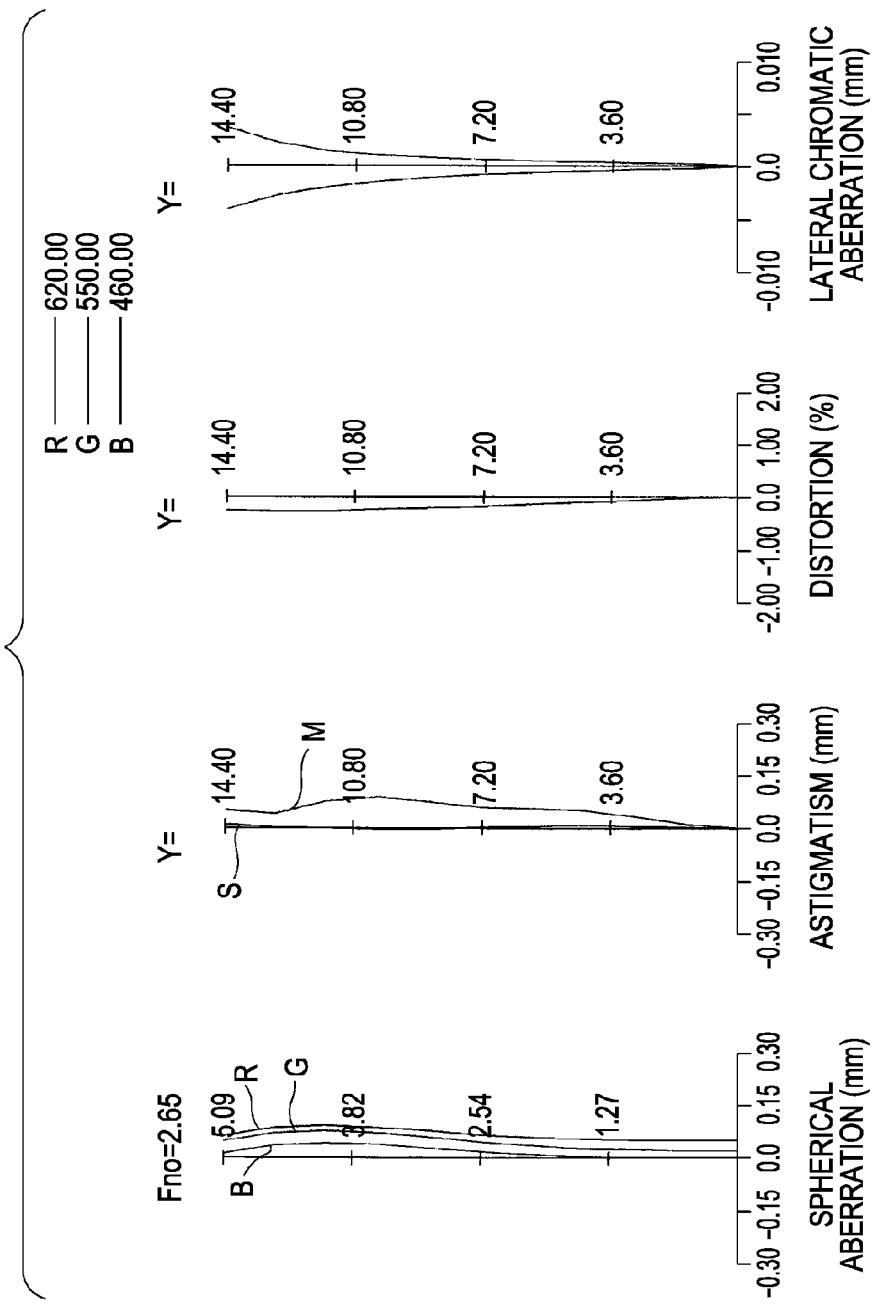

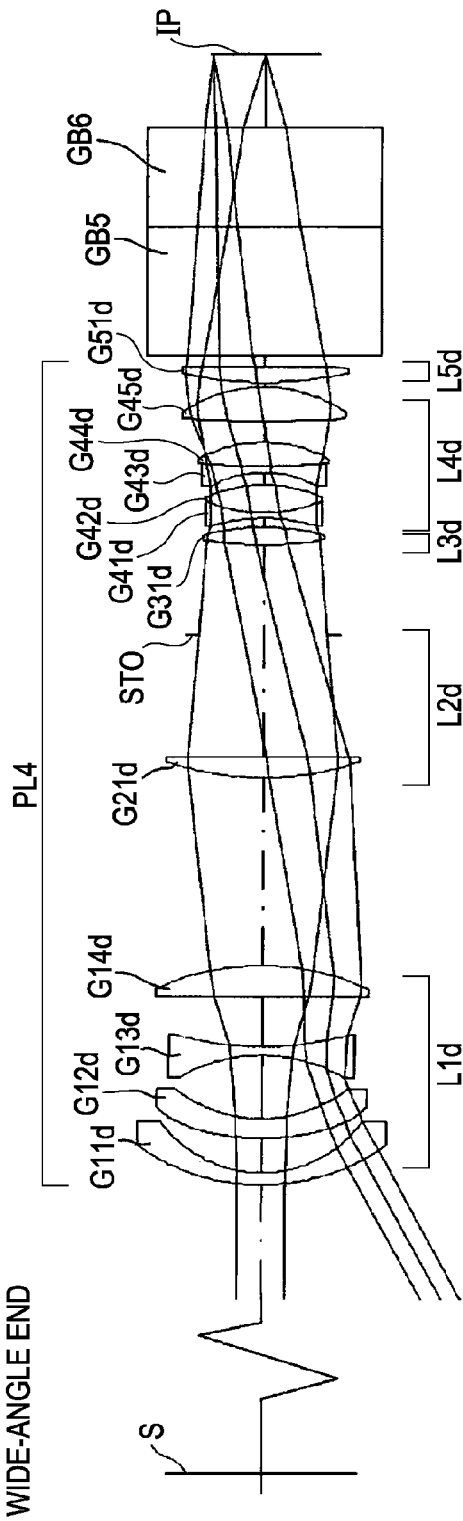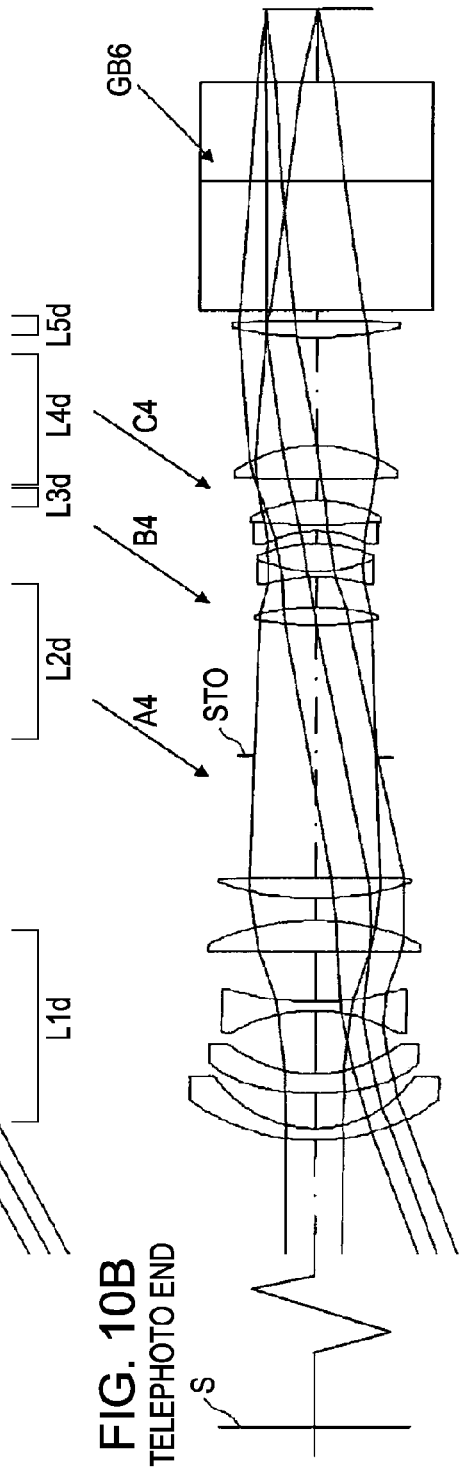
FIG. 10A WIDE-ANGLE END
FIG. 10B TELEPHOTO END

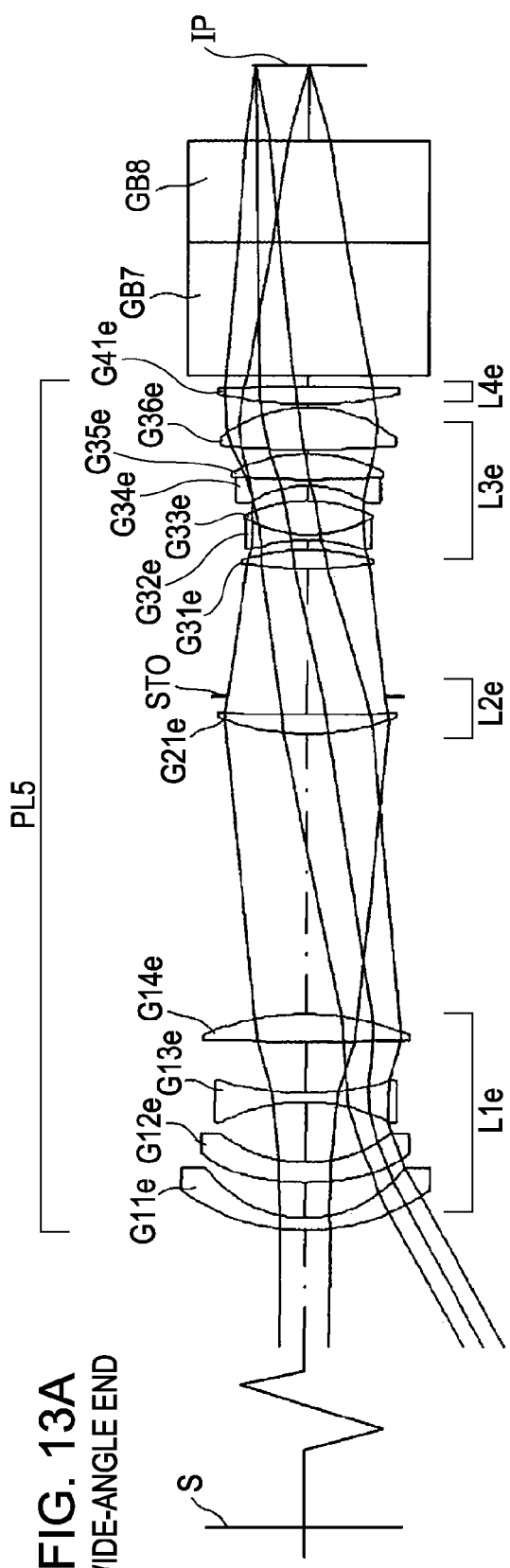
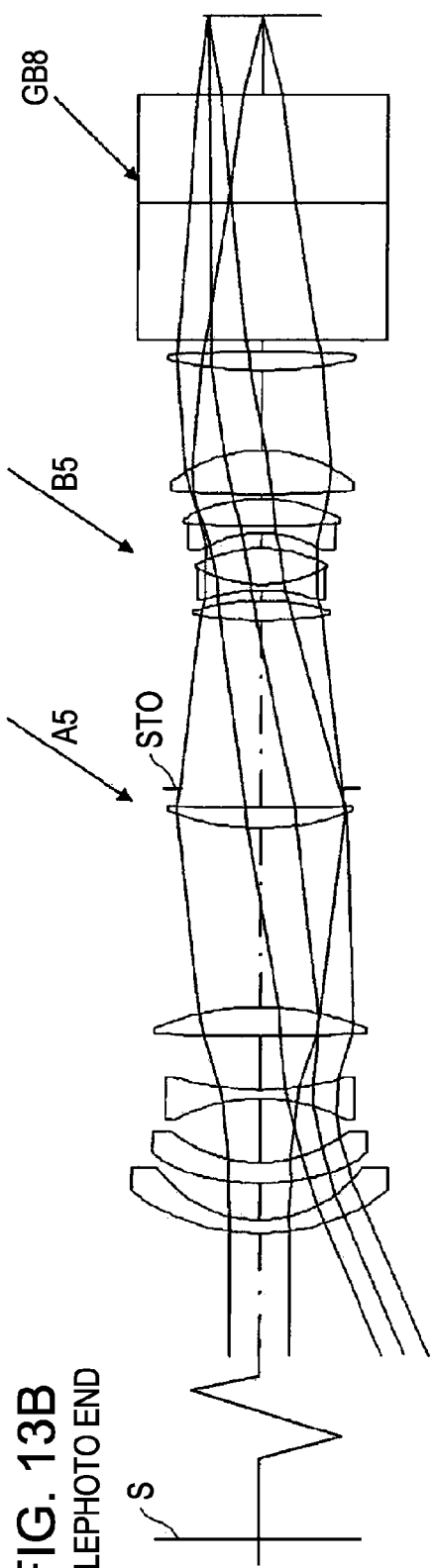
FIG. 13A WIDE-ANGLE END
FIG. 13B TELEPHOTO END

ZOOM LENS AND IMAGE PROJECTION APPARATUS HAVING THE SAME

BACKGROUND OF THE INVENTION

1. Field of the Invention

The present invention relates to zoom lenses having a zooming function and optical instruments having the zoom lens.

2. Description of the Related Art

Extremely strict specifications especially in a color shift (lateral chromatic aberration) among optical functions are required for zoom lenses used in liquid crystal projectors in response to the demand for higher fineness of projected images.

In general, for correcting the lateral chromatic aberration, it is effective to use a lens made of anomalous dispersion glass.

For example, one conventional system discusses the use of a zoom lens that is corrected in lateral chromatic aberration using a lens made of the anomalous dispersion glass, where the zoom lens is used in a liquid crystal projector (U.S. Pat. Nos. 6,816,320, 7,016,118).

Recently, the market has emphasized a strong demand for a zoom lens, for use in a liquid crystal projector that has a higher zoom ratio, a wider angular field, and a larger aperture for using illumination light at higher efficiency, as well as a higher optical performance over the entire zooming region. These demanded characteristics widely relate to the correction of various aberrations including spherical aberration and lateral chromatic aberration and changes in aberrations accompanied by zooming.

In particular, the changes in spherical aberration and lateral chromatic aberration involved in zooming greatly affect the optical performance among the demanded characteristics, so that the reduction thereof has been required.

In order to have high optical performance while favorably correcting the spherical aberration and the lateral chromatic aberration over the entire zooming range, the lens configuration and the material of each lens must be appropriately established.

SUMMARY OF THE INVENTION

At least one exemplary embodiment of the present invention is directed to a zoom lens having improved optical performance over the various image planes by correcting various aberrations accompanied by the zooming, where the zoom lens can be used in a liquid crystal projector.

At least one exemplary embodiment is directed to a zoom lens which includes a plurality of lens units, wherein the plurality of lens units have at least one negative lens, including a first negative lens Gn1 arranged at a position where an effective diameter is minimized among negative lenses of the zoom lens, where when the at least one negative lens is represented by an $i^{th}$ negative lens Gni indicating the $i^{th}$ negative lens from an expansion side toward the reduction side and $Xi=\theta gFni-(0.6438-0.001682\times vdni)$, the following condition is satisfied:

$$(\Sigma Xi \times fni)/(\Sigma fni) < -0.003,$$

where the Abbe number and the partial dispersion ratio of the material of the $i^{th}$ negative lens Gni are vdni and $\theta gFni$, respectively, and the focal length of the $i^{th}$ negative lens Gni is fni.

At least one exemplary embodiment is directed to an image projection apparatus which includes a display unit configured to form an original picture; and a zoom lens configured to project the original picture formed by the display unit on a plane to be projected, where the zoom lens, substantially telecentric on a reduction side, includes a plurality of lens units, wherein the plurality of lens units include at least one negative lens including a first negative lens Gn1 arranged at a position where an effective diameter is minimized among negative lenses constituting the zoom lens, where when the at least one negative lens is represented by the $i^{th}$ negative lens Gni indicating the $i^{th}$ negative lens from an expansion side toward the reduction side and $Xi=\theta gFni-(0.6438-0.001682\times vdni)$, the following condition is satisfied:

$$(\Sigma Xi \times fni)/(\Sigma fni) < -0.003,$$

where the Abbe number and the partial dispersion ratio of the material of the $i^{th}$ negative lens Gni are vdni and $\theta gFni$, respectively, and the focal length of the $i^{th}$ negative lens Gni is fni.

At least one exemplary embodiment is directed to an image projection apparatus which includes a display unit configured to form an original picture; and a zoom lens configured to project the original picture formed by the display unit on a plane to be projected, where at least one optical element, being substantially without refractive power, is arranged on a reduction side of the zoom lens, and where when reference character j indicates the order of the at least one optical element arranged from an expansion side toward the reduction side, the zoom lens satisfies the following equation:

$$0.02 < \{\Sigma(NFj-NCj)\times Dj\}/fw < 0.15,$$

where refractive indexes of F-ray and C-ray of the $j^{th}$ optical element material are NFj and NCj, respectively, the length of the $j^{th}$ optical element in the optical axial direction is Dj, and the entire system focal length at the wide-angle end is fw.

At least one further exemplary embodiment is directed to an image pickup apparatus which includes a solid-state image pickup device; and a zoom lens configured to focus an object image on the solid-state image pickup device, where the zoom lens, being substantially telecentric on a reduction side, includes a plurality of lens units, wherein the plurality of lens units includes at least one negative lens including a first negative lens Gn1 arranged at a position where an effective diameter is minimized among negative lenses constituting the zoom lens, wherein when the at least one negative lens is represented by an $i^{th}$ negative lens Gni indicating the $i^{th}$ negative lens from an expansion side toward the reduction side and $Xi=\theta gFni-(0.6438-0.001682\times vdni)$, the following condition is satisfied:

$$(\Sigma Xi \times fni)/(\Sigma fni) < -0.003,$$

where the Abbe number and the partial dispersion ratio of the material of the $i^{th}$ negative lens Gni are vdni and $\theta gFni$, respectively, and the focal length of the $i^{th}$ negative lens Gni is fni.

Further features of the present invention will become apparent from the following description of exemplary embodiments with reference to the attached drawings.

BRIEF DESCRIPTION OF THE DRAWINGS

FIG. 9 illustrates aberration data of the zoom lens according to the third exemplary embodiment at the telephoto end.

FIG. 10 includes schematic views of part of an image projection apparatus using a zoom lens according to a fourth exemplary embodiment.

FIG. 13 includes schematic views of part of an image projection apparatus using a zoom lens according to a fifth exemplary embodiment.

DESCRIPTION OF THE EMBODIMENTS

Figure 1:
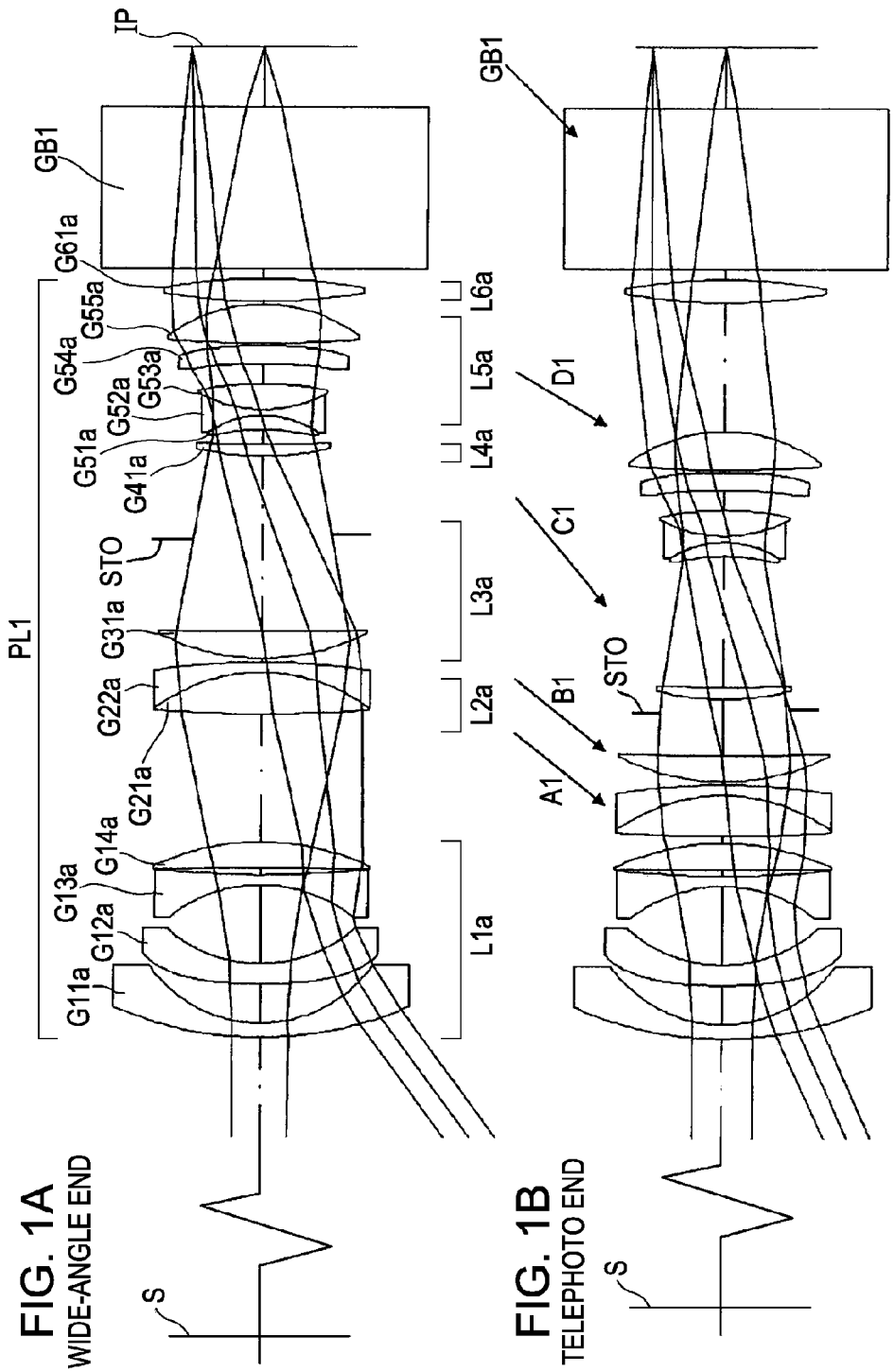
FIGS. 1A and 1B are schematic views of part of an image projection apparatus using a zoom lens according to a first exemplary embodiment.

In exemplary embodiments, a zoom lens substantially telecentric on a reduction side includes a plurality of lens unit. The plurality of lens unit includes a first negative lens Gn1 arranged at a position where an effective diameter is minimized among negative lenses constituting the zoom lens. The plurality of lens unit includes at least one negative lens from an expansion side toward the reduction side (the at lease one negative lens includes the first negative lens Gn1). When the at least one negative lens is represented by an $i^{th}$ negative lens Gni indicating the $i^{th}$ negative lens from an expansion side toward the reduction side (the above-described first negative lens is indicated as Gn1) and $Xi=\theta gFni-(0.6438-0.001682\times vdni)$, the following condition is satisfied:

$(\Sigma Xi \times fni)/(\Sigma fni) < -0.003$, where the Abbe number and the partial dispersion ratio of the material of the $i^{th}$ negative lens Gni are vdni and $\theta gFni$, respectively, and the focal length of the $i^{th}$ negative lens Gni is fni. The structure of zoom lens arranges without the $2^{nd}$, $3^{rd}$, ..., negative lens is also one of the exemplary embodiments of the present invention.

Exemplary embodiments of the present invention relate to zoom lenses and liquid crystal projectors (image projection apparatuses) and optical instruments such as an image pickup apparatus having the zoom lenses for projecting image information on a predetermined plane (screen, etc.). The zoom lens and the liquid crystal projector (image projecting apparatus) according to exemplary embodiments of the present invention and exemplary embodiments of the image pickup apparatus will be described below in detail with reference to the drawings. The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

First, reference characters will be described. Characters L1$i$ to L6$i$ denote first to sixth lens units (e.g., L1-4$a$-$e$, L5$a$-$d$, and L6$a$-$b$); character STO an aperture diaphragm; character IP an image plane (e.g., a liquid crystal panel (liquid crystal displaying (LCD) device)); character GB1-8 a glass block; character S sagittal field tilt; and character M meridional field tilt. Reference numeral 101 denotes a liquid crystal projector; numeral 102 color combining device; numeral 103 a projection lens; numeral 104 a screen; numerals 105B, 105G, and 105R are liquid crystal panels; numeral 106 an image pickup apparatus; numeral 107 image picking up device; numeral 108 a taking lens; and further numeral 109 an object.

FIGS. 1A and 1B are schematic views of part of an image projection apparatus (liquid crystal video projector) using a zoom lens according to a first exemplary embodiment at a wide-angle end and a telephoto end, respectively.

Figure 2:
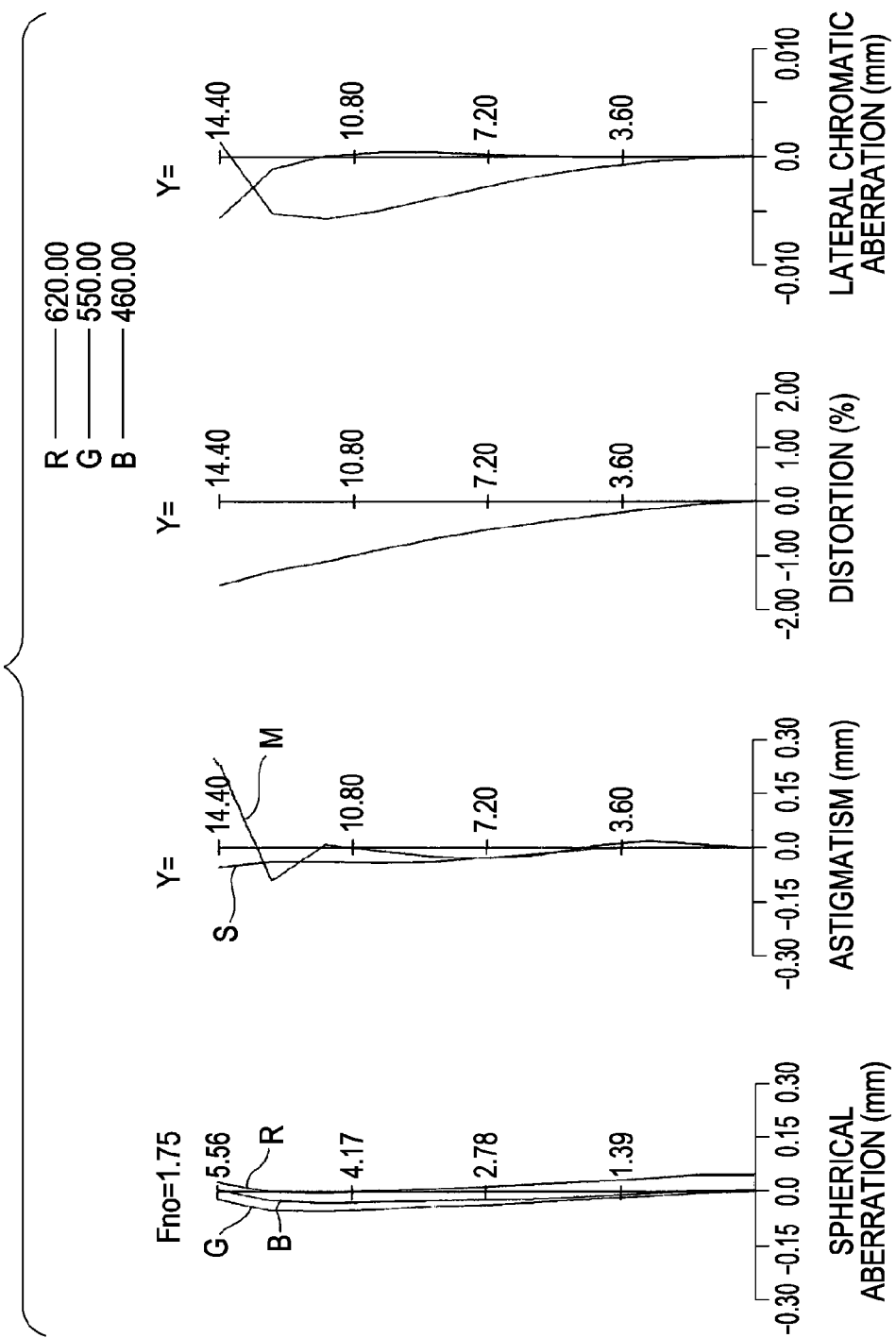
FIG. 2 illustrates aberration data of the zoom lens according to the first exemplary embodiment at a wide-angle end.
Figure 3:
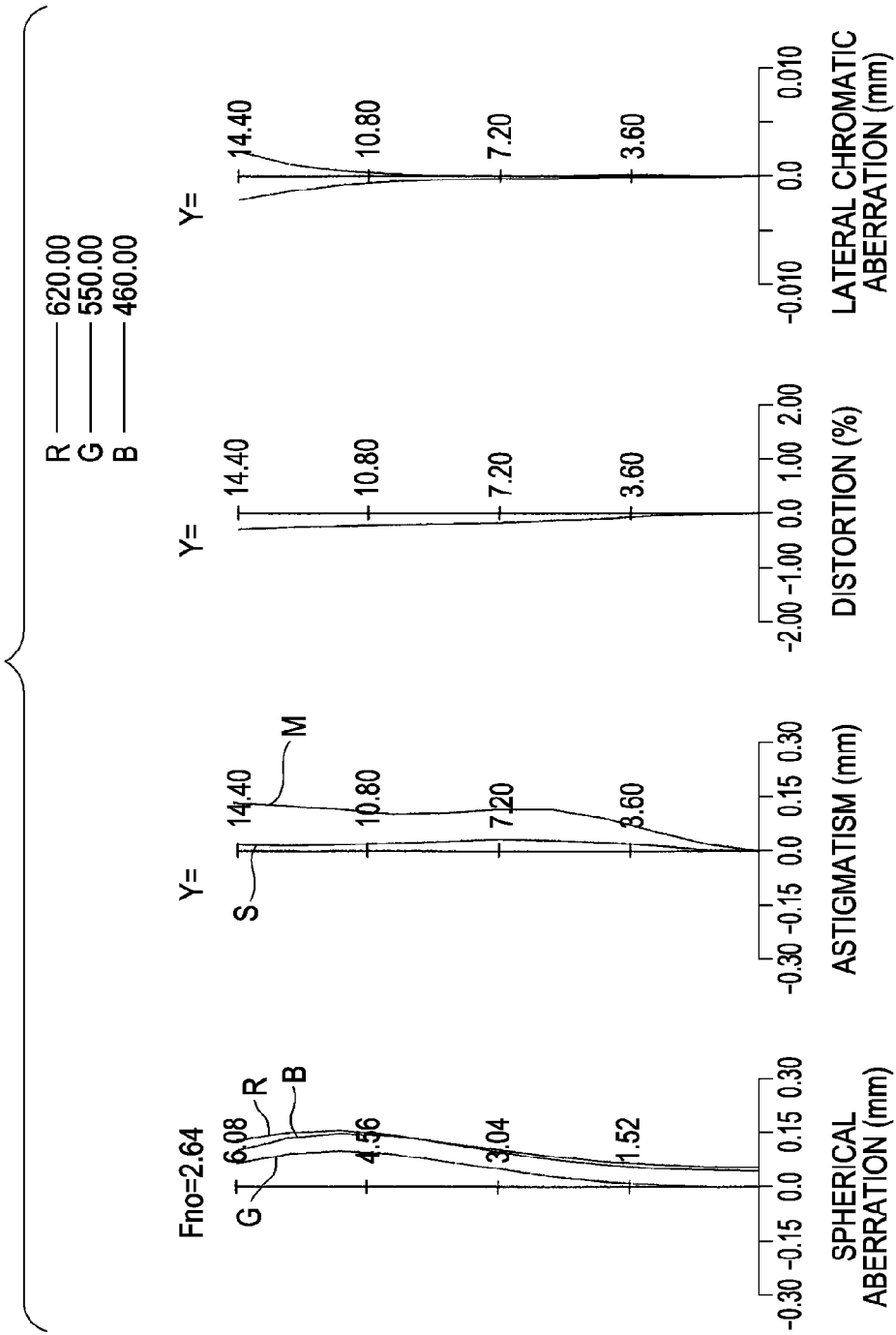
FIG. 3 illustrates aberration data of the zoom lens according to the first exemplary embodiment at a telephoto end.

FIGS. 2 and 3 are illustrations of aberration data of the first exemplary embodiment when the distance (between a first lens unit and a screen) is 1760 mm at the wide-angle end and the telephoto end, respectively.

Figure 4:
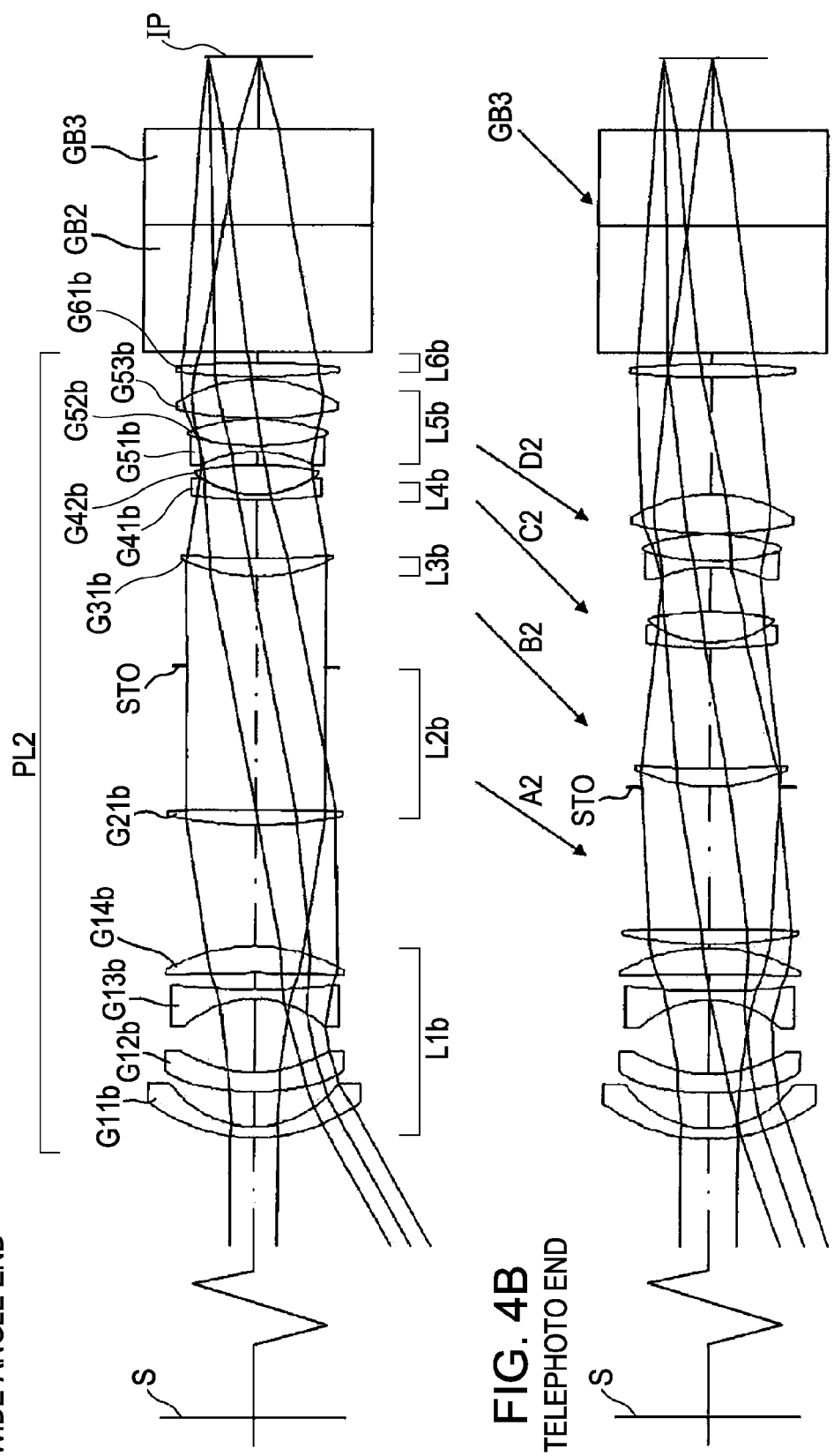
FIGS. 4A and 4B are schematic views of part of an image projection apparatus using a zoom lens according to a second exemplary embodiment.

FIGS. 4A and 4B are schematic views of part of an image projection apparatus using a zoom lens according to a second exemplary embodiment at the wide angle end and the telephoto end, respectively.

Figure 5:
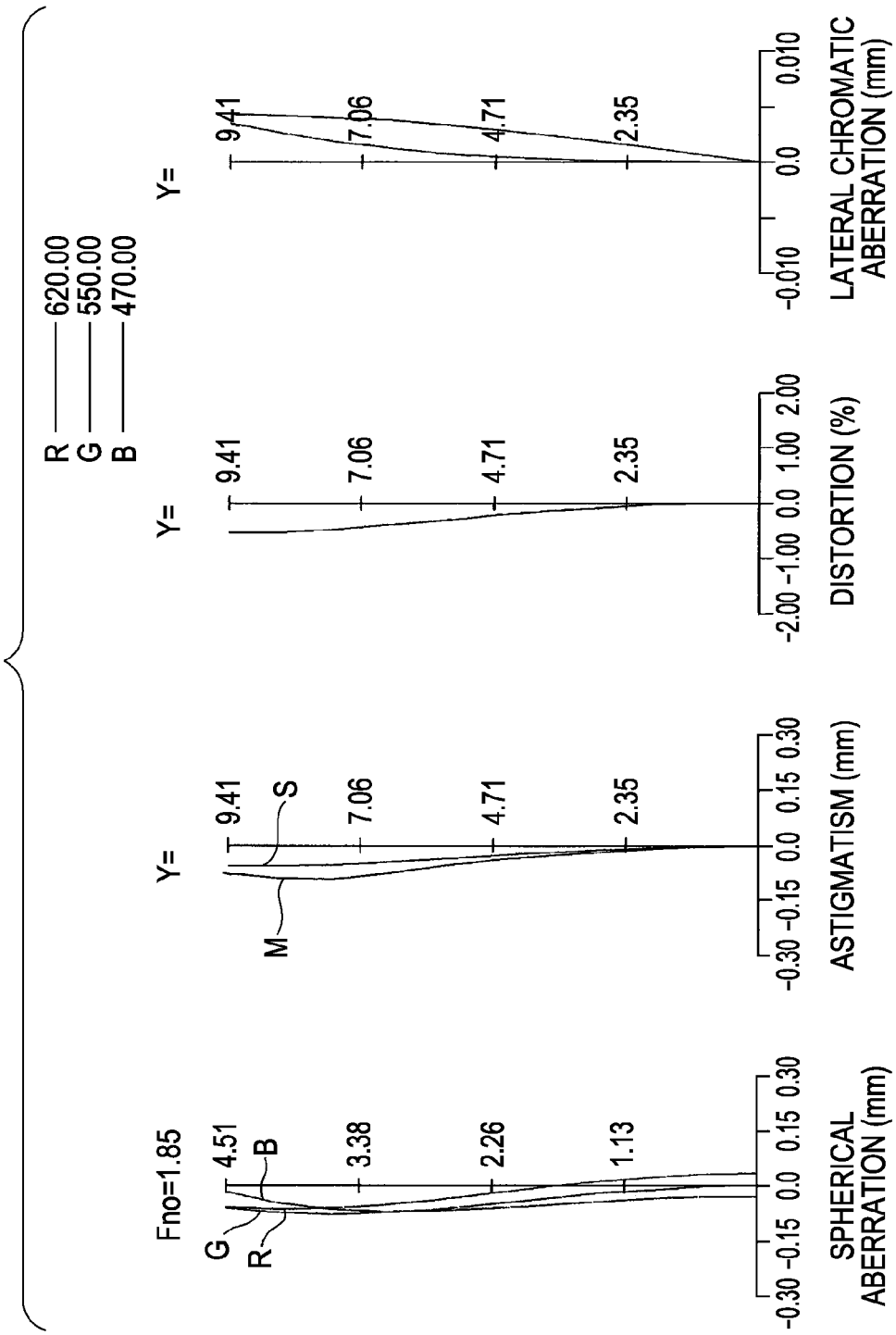
FIG. 5 illustrates aberration data of the zoom lens according to the second exemplary embodiment at the wide-angle end.
Figure 6:
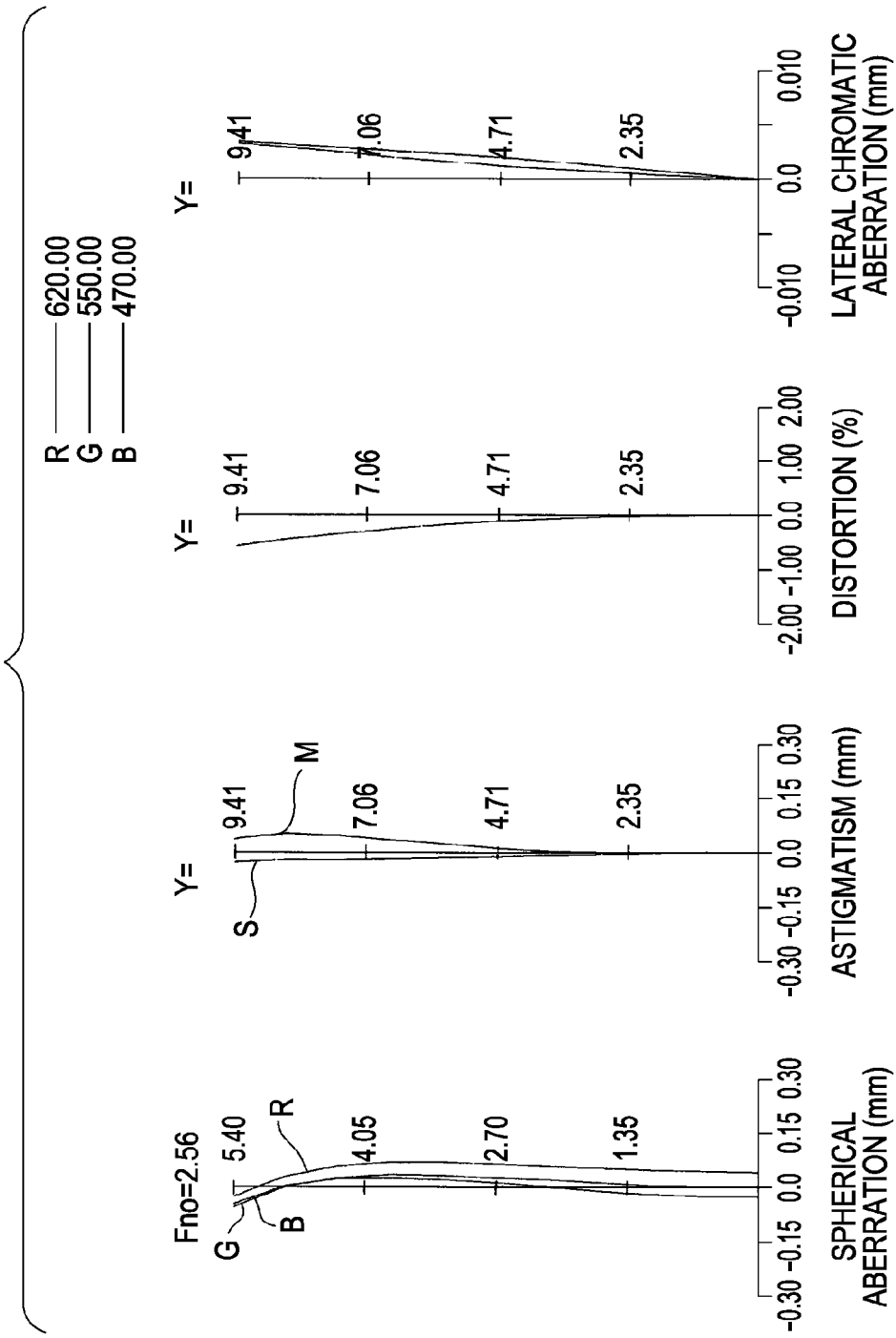
FIG. 6 illustrates aberration data of the zoom lens according to the second exemplary embodiment at the telephoto end.

FIGS. 5 and 6 are illustrations of aberration data of the second exemplary embodiment when the distance to a screen is 2100 mm at the wide-angle end and the telephoto end, respectively.

Figure 7:
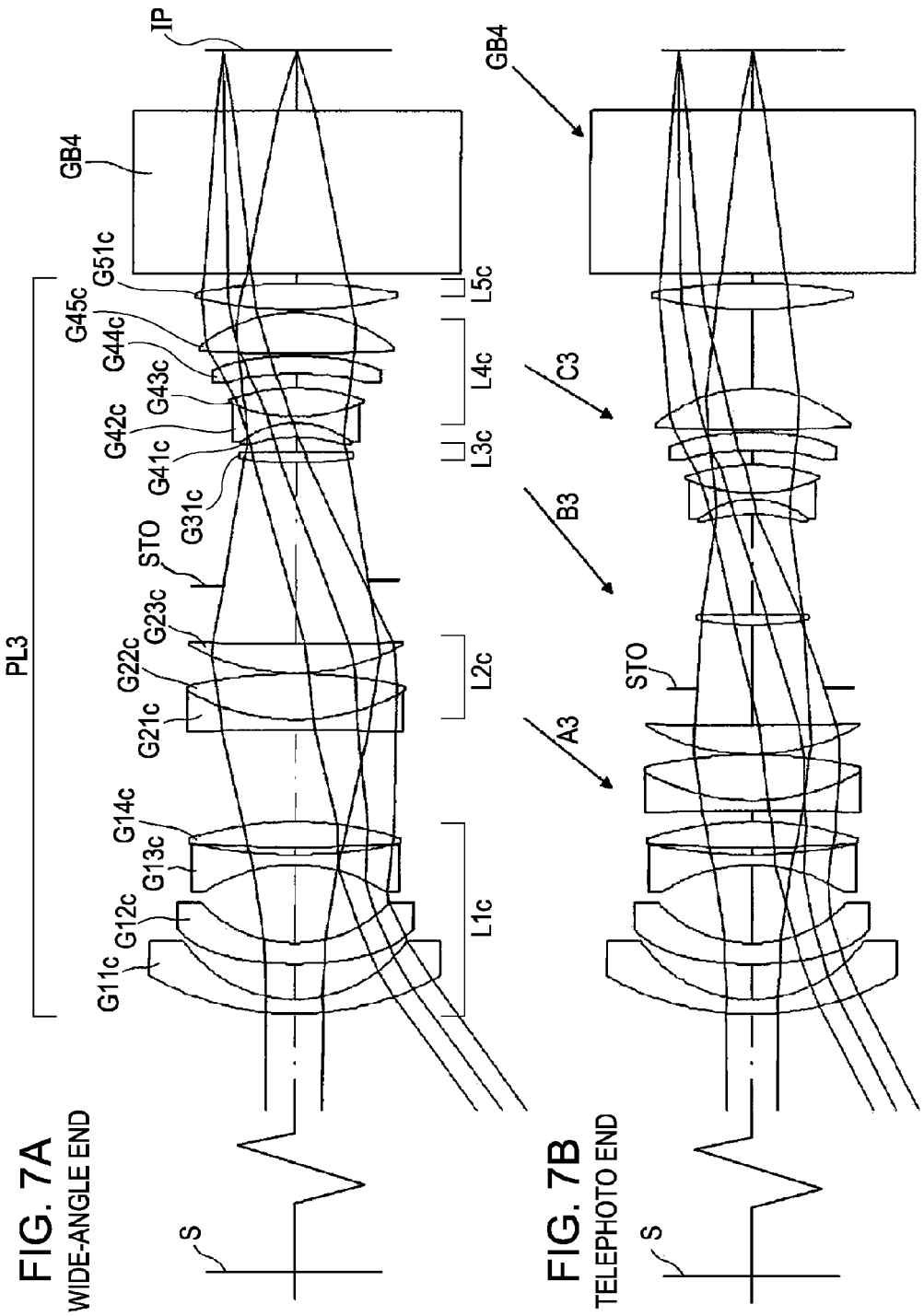
FIG. 7 includes schematic views of part of an image projection apparatus using a zoom lens according to a third exemplary embodiment.

FIGS. 7A and 7B are schematic views of part of an image projection apparatus using a zoom lens according to a third exemplary embodiment at the wide angle end and the telephoto end, respectively.

Figure 8:
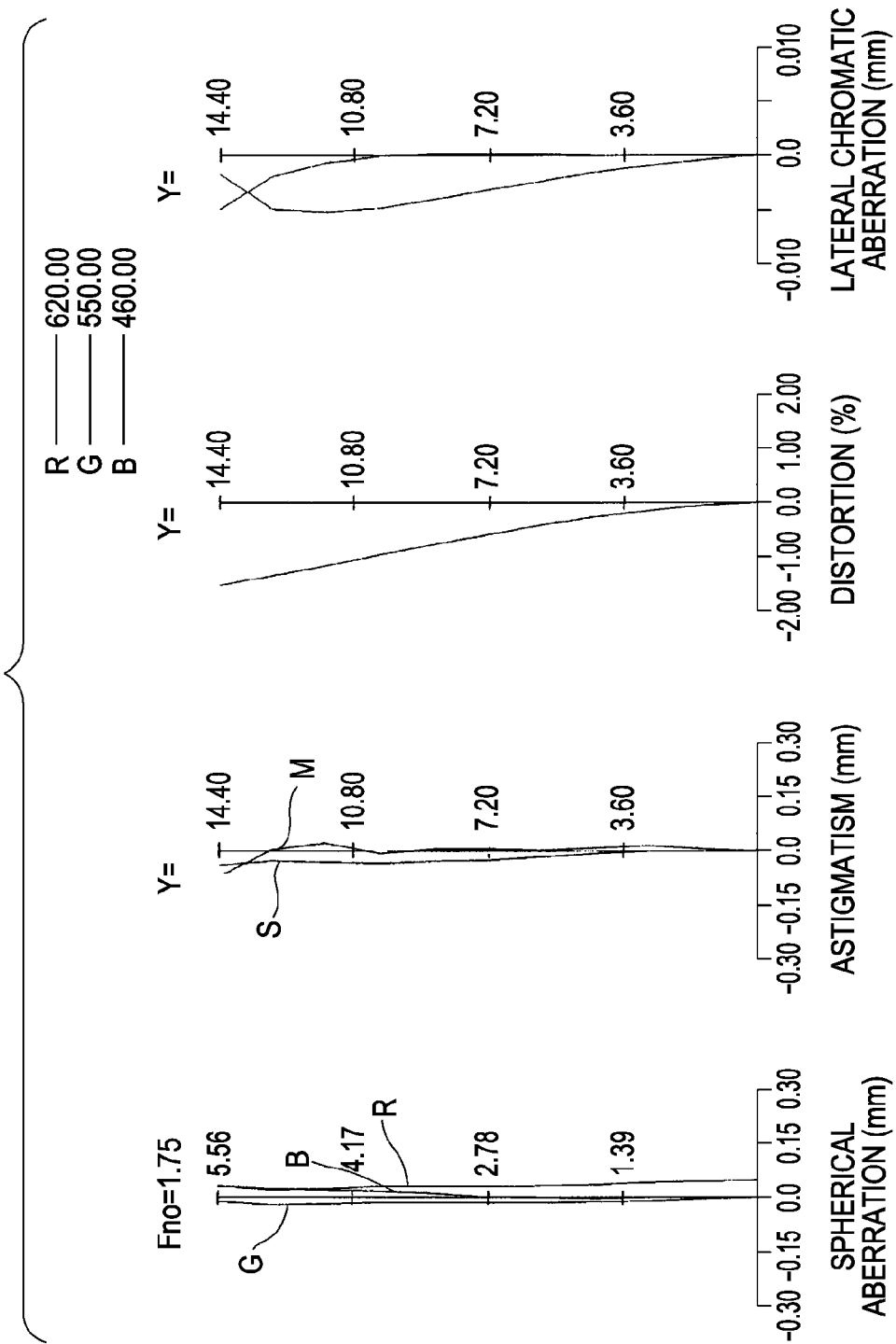
FIG. 8 illustrates aberration data of the zoom lens according to the third exemplary embodiment at the wide-angle end.

FIGS. 8 and 9 are illustrations of aberration data of the third exemplary embodiment when the distance to a screen is 1760 mm at the wide-angle end and the telephoto end, respectively.

FIGS. 10A and 10B are schematic views of part of an image projection apparatus using a zoom lens according to a fourth exemplary embodiment at the wide angle end and the telephoto end, respectively.

Figure 11:
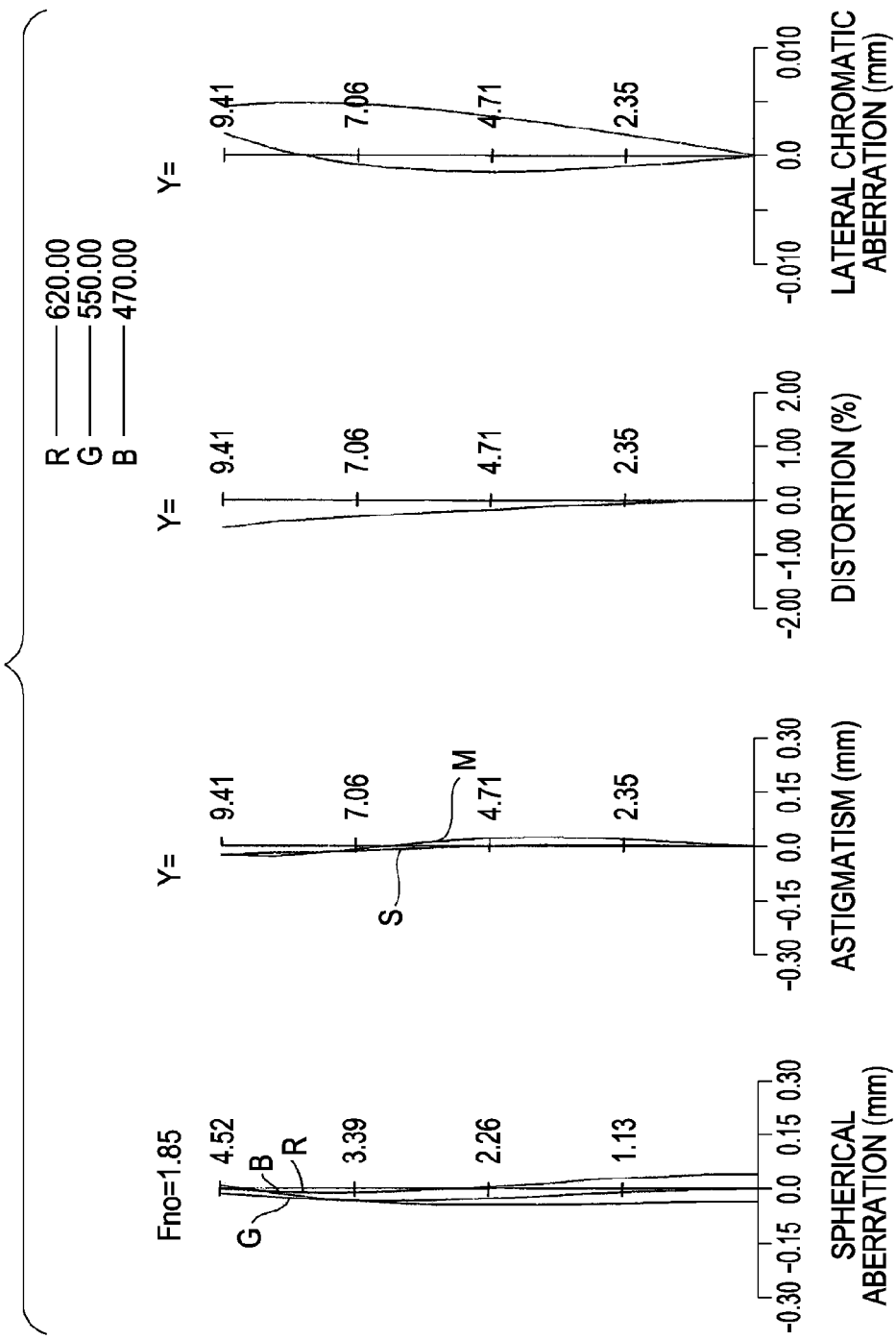
FIG. 11 illustrates aberration data of the zoom lens according to the fourth exemplary embodiment at the wide-angle end.
Figure 12:
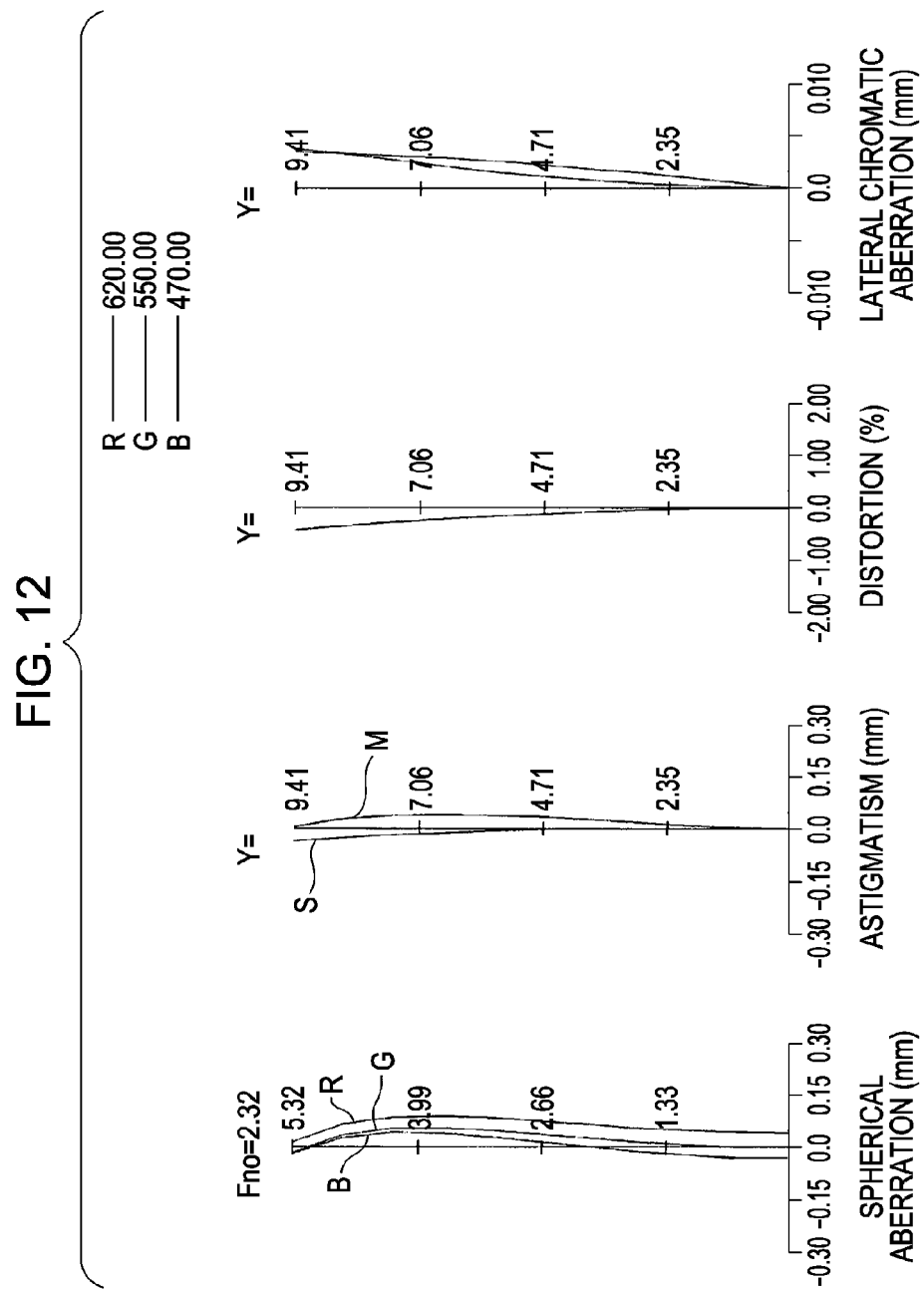
FIG. 12 illustrates aberration data of the zoom lens according to the fourth exemplary embodiment at the telephoto end.

FIGS. 11 and 12 are illustrations of aberration data of the fourth exemplary embodiment when the distance to a screen is 2100 mm at the wide-angle end and the telephoto end, respectively.

FIGS. 13A and 13B are schematic views of part of an image projection apparatus using a zoom lens according to a fifth exemplary embodiment at the wide angle end and the telephoto end, respectively.

Figure 14:
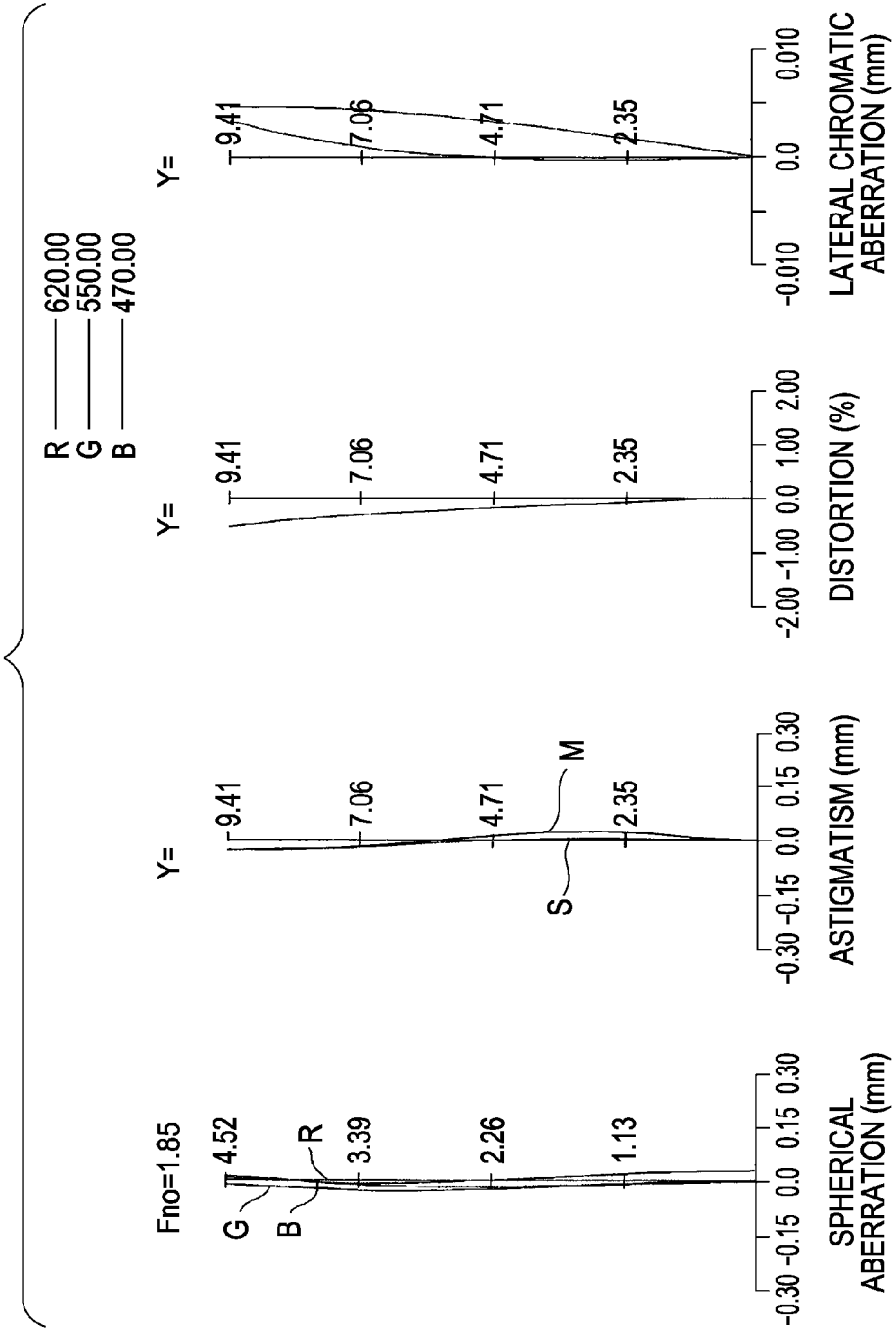
FIG. 14 illustrates aberration data of the zoom lens according to the fifth exemplary embodiment at the wide-angle end.
Figure 15:
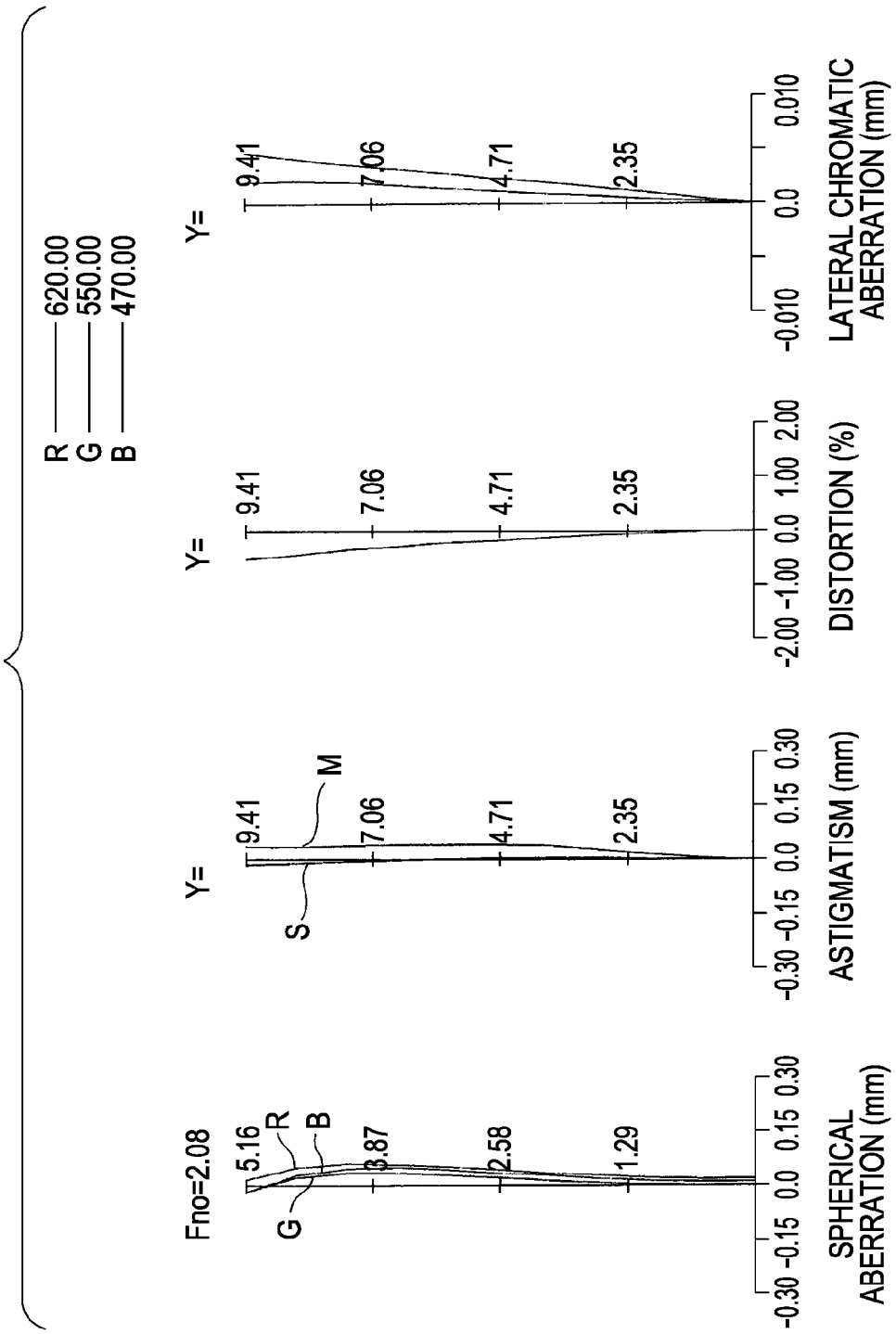
FIG. 15 illustrates aberration data of the zoom lens according to the fifth exemplary embodiment at the telephoto end.

FIGS. 14 and 15 are illustrations of aberration data of the fifth exemplary embodiment when the distance to a screen is 2100 mm at the wide-angle end and the telephoto end, respectively.

Figure 16:
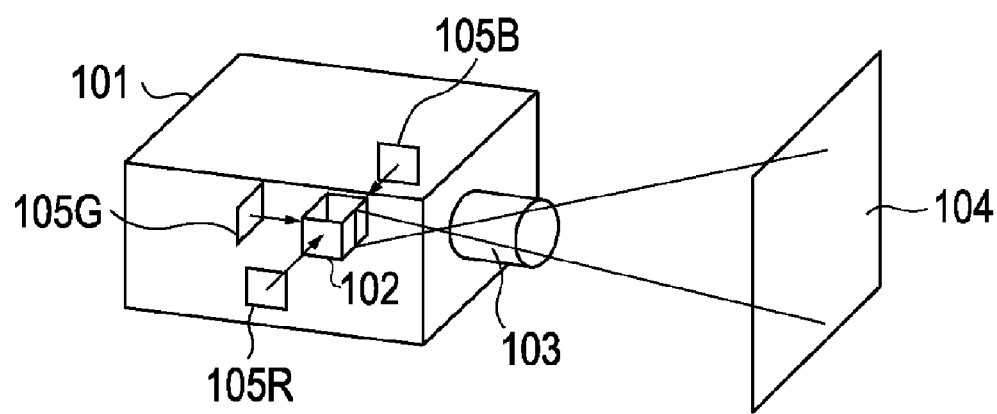
FIG. 16 is a schematic view of part of a color liquid crystal projector.

FIG. 16 is a schematic view of part of a color liquid crystal projector.

Figure 17:
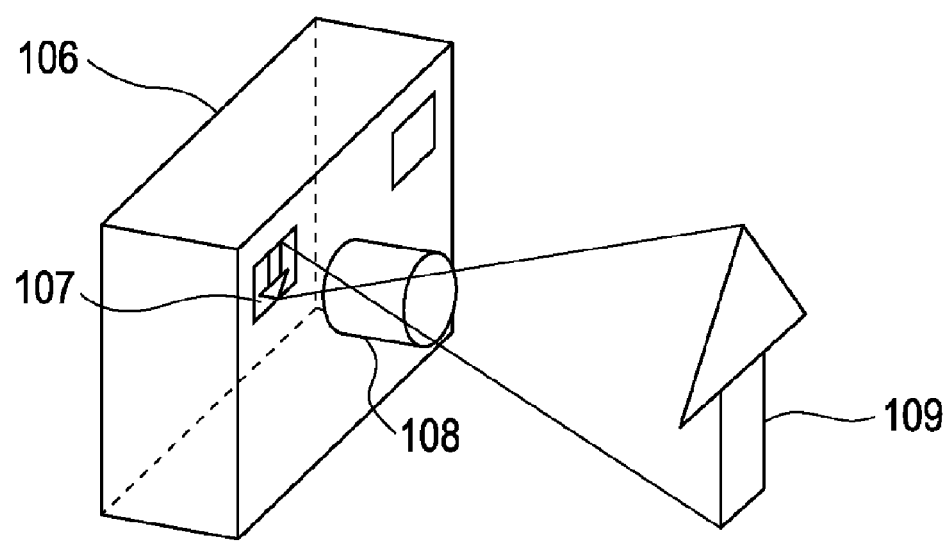
FIG. 17 is a schematic view of part of an image pickup apparatus.

FIG. 17 is a schematic view of part of an image pickup apparatus.

In the image projection apparatuses according to the first to fifth exemplary embodiments shown in FIGS. 1A-B, 4A-B, 7A-B, 10A-B, and 13A-B, original images (images to be projected) displayed on an image plane (e.g., a liquid crystal panel) are projected on a screen S by enlarging using a zoom lens (projection lens) PL1-5.

Reference character S denotes a screen plane (projection plane), and character LCD represents a liquid crystal panel (liquid crystal display device) positioned at the image plane of the zoom lens PL. The screen plane S and the image plane (IP) (e.g., a liquid crystal panel LCD) are conjugate to each other. In general, the screen plane S corresponds to an expansion side (fore expansion conjugate side) at a longer-distance conjugate point while the image plane IP (e.g., a liquid crystal panel LCD) corresponds to a reduction side (rear reduction conjugate side) at a smaller-distance conjugate point.

When the zoom lens is used in a photographic system, the screen plane S is an object side opposite the image plane (IP) on the image side.

Reference character STO denotes an aperture diaphragm.

Reference characters GB1-8 denote a glass block provided in optical design correspondingly to a color composition prism, a polarization filter, and a color filter.

The zoom lens PL1-5 is attached to projector body (not shown)(e.g., a liquid crystal projector body) via coupling parts (not shown). Components ranging from the glass block GB1-8 toward the image plane IP (e.g., a liquid crystal panel LCD) are included in the liquid crystal projector body.

In addition, the glass blocks GB1-8 can be included in the zoom lens PL1-5 as a component while the image plane IP (e.g., a liquid crystal panel LCD) can be included in the liquid crystal projector body.

If character i denotes the order of a lens unit from the expansion side to the reduction side, Li represents the $i^{th}$ lens unit.

Character arrow (e.g., A1-5, B1-5, C1-4, and D1-2) shows a trajectory direction of each lens unit between the wide-angle end and the telephoto end.

The image plane IP (e.g., a liquid crystal panel LCD) is irradiated with light from an illumination optical system (not shown) provided on the reduction side.

The zoom lens PL1-5 includes a telecentric property, in which a pupil provided adjacent to the image plane IP (e.g., a liquid crystal panel LCD) (reduction side) is a long way off, for securing favorable pupilary consistency.

The glass block GB1-8 includes a combining device for combining R, G, and B images of the liquid crystal panel, selecting device for only selecting a specific polarizing direction, and changing device for changing the phase of polarized light.

In the zoom lens PL1-5 according to the exemplary embodiments, by employing a plurality of negative lead lens units, in which a lens with negative refractive power takes a lead (is positioned on the expansion side), a back focus long enough for arranging the glass blocks GB1-8 is easily secured.

In the zoom lens PL1-5 according to the exemplary embodiments, for obtaining a zooming function, several lens units are moved (e.g., A1-5, B1-5, C1-4, and D1-2) along an optical axis so as to change the composite focal length of the entire system.

According to the first and second exemplary embodiments shown in FIGS. 1A-B and 4A-B, during zooming from the wide-angle end to the telephoto end, the second lens unit L2a-b, the third lens unit L3a-b, the fourth lens unit L4a-b, and the fifth lens unit L5a-b are independently moved toward the screen plane S (expansion side) as shown in arrows (A1-2, B1-2, C1-2, and D1-2).

The first lens unit L1a-b and the sixth lens unit L6a-b do not move for the zooming.

According to the third and fourth exemplary embodiments shown in FIGS. 7A-B and 10A-B, during zooming from the wide-angle end to the telephoto end, the second lens unit L2c-d, the third lens unit L3c-d, and the fourth lens unit L4c-d are independently moved toward the screen plane S as shown in arrows (A3-4, B3-4, and C3-4).

The first lens unit L1c-d and the fifth lens unit L5c-d do not move for the zooming.

According to the fifth exemplary embodiment shown in FIGS. 13A-B, during zooming from the wide-angle end to the telephoto end, the second lens unit L2e and the third lens unit L3e are independently moved toward the expansion side as shown in arrows (A5 and B5).

The first lens unit L1e and the fourth lens unit L4e do not move for the zooming.

According to the exemplary embodiments, the focusing is executed by moving the first lens unit L1a-e along the optical axis.

Alternatively, the focusing can be executed by moving the image plane IP (e.g., a liquid crystal panel LCD).

According to the first exemplary embodiment shown in FIGS. 1A-B, the aperture diaphragm STO is arranged adjacent to the reduction side of the third lens unit L3a.

According to the second to fifth exemplary embodiments shown in FIGS. 4A-B, 7A-B, 10A-B, and 13A-B, the aperture diaphragm STO is arranged adjacent to the reduction side of the second lens unit L2c-e.

The aperture diaphragm STO is moved (A1-A5) during the zooming.

Each lens surface is coated with an antireflective substance in multiple layers.

In the illustrations of aberration data, character G shows the aberration at the wavelength 550 nm; character R at 620 nm; character B at 470 nm; both the characters S (sagittal field tilt) and M (meridional field tilt) at 550 nm; character Fno denotes F number; character ω a half field angle; and character Y an image height.

In general, in a negative lead projection lens with the negative refractive power lens unit positioned on the expansion side to the utmost, a variable power lens unit with strong refractive power positioned on the expansion side from the aperture diaphragm STO is moved along the optical axis so as to change the composite focal length of the entire system.

A positive power lens unit generates many various aberrations including at the threshold of the spherical aberration and the longitudinal chromatic aberration. Therefore, these various aberrations need to be corrected by arranging the lens unit with strong negative power (referred to as a compensation lens unit below) on the reduction side from the aperture diaphragm STO.

In order to effectively correct the spherical aberration and the longitudinal chromatic aberration, the lens material of the compensation lens unit can be generally high dispersion glass. If a low dispersion glass material is assumed to be used in the lens of the compensation lens unit, the power of the negative lens is required to increase for efficiently correcting the longitudinal chromatic aberration. As a result, the correction of the spherical aberration becomes excessive, so that it is difficult to correct the spherical aberration and the lateral chromatic aberration in a well-balanced manner.

However, among available glass materials, the glass having a high-dispersion characteristic has a large partial dispersion amount. When a lens made of such a glass material is used in the negative lens on the reduction side of the diaphragm, many secondary spectra are generated, so that the lateral chromatic aberration can be difficult to correct.

The generation of the lateral chromatic aberration will be described below in detail with reference to arithmetic expressions. According to the book "Renzu Sekkeihou (Lens Design Method)" by Yoshiya MATSUI, a lateral chromatic aberration factor Tv on a plane v is expressed as follows:

$$T_v = h_v \bar{h}_v \bar{Q}_v \Delta_v \left( \frac{\partial N}{N} \right)$$

$$\bar{h}_v \bar{Q}_v = \bar{h}_v \frac{N_v}{I_v} - \bar{\alpha}_v$$

where, $\bar{h}$: off-axial chief ray height (paraxial chief ray height) (referred to as a "hb" below)

N: refractive index r: radius of curvature $\bar{\alpha}$: paraxial chief ray angle (referred to as a "αa" below)

h: paraxial marginal ray height (referred to as a "ha" below)

The paraxial marginal ray herein refers to a ray incident in parallel with the optical axis of the optical system at a height "1" from the optical axis when the focal length of the entire optical system is normalized to be "1." The paraxial chief ray refers to a ray passing through the intersecting point between the entrance pupil of the optical system and the optical axis among rays incident at an angle of −45° to the optical axis when the focal length of the entire optical system is normalized to be "1." The incident angle of the optical system is defined so that the clockwise angle is positive and the counterclockwise angle is negative.

The ray is to be emitted from the expansion side (the screen side according to the exemplary embodiment). The screen is located on the left side of the optical system, so that the ray incident to the optical system from the screen proceeds from the left to the right.

As is understood from the above equations, it is generally effective for suppressing the lateral chromatic aberration to the utmost that the compensation lens unit be arranged at a position where the paraxial chief ray height hb is small to the utmost, i.e., the effective diameter is smallest. Then, according to the exemplary embodiments, the negative lens arranged at a position, where the effective diameter is smallest, is included in the compensation lens unit, as will be described later. The effective diameter refers to the distance between the optical axis and the ray passing through a position farther from the optical axis in between the outermost ray (marginal ray) of the luminous flux emitted from the center of the conjugate plane on the reduction side and the outermost ray of the luminous flux emitted from the off-axial point (point separated from the optical axis to the utmost) of the conjugate plane on the reduction side.

However, the paraxial chief ray angle αa and the paraxial chief ray height hb cannot be reduced simultaneously, so that the generation of the lateral chromatic aberration in the compensation lens unit cannot be avoided after all. If the lens made of a glass material with a large partial dispersion ratio (i.e., δN/N in the above equations) is used at such a position (position where the paraxial chief ray height hb becomes smallest), the lateral chromatic aberration is largely generated. In order to favorably correct this aberration, anomalous dispersion glass must be used.

Then, according to the exemplary embodiments, without using the anomalous dispersion glass, as the material of negative lenses constituting the compensation lens unit, a glass material, having a slightly smaller partial dispersion ratio than that of the material generally used for the compensation lens unit, is used so as to reduce the generation of the lateral chromatic aberration.

Furthermore, by the configurations, which will be described later, the spherical aberration and the longitudinal chromatic aberration are corrected in a balanced manner.

Next, the features of the zoom lens according to the exemplary embodiments will be described.

The zoom lens PL1-5 according to the exemplary embodiments includes a plurality of lens units telecentric on the reduction side. The negative lens Gn with the minimum effective diameter is standardized as a reference among lenses constituting the zoom lens PL1-5. Character i represents the order of the negative lenses including the negative lens Gn and arranged in the reduction side of the negative lens Gn.

At this time, the Abbe number and the partial dispersion ratio of the material of the $i^{th}$ negative lens Gni are vdni and θgFni, respectively, and the focal length of the negative lens Gni is fni.

When the anomalous dispersion amount Xi=θgFni−(0.6438−0.001682×vdni), the following condition (1) is satisfied:

$$(\Sigma Xi \times fni)/(\Sigma fni) < -0.003 \quad (1).$$

The refractive indexes herein of the material for g-ray, d-ray, F-ray, and C-ray are Ng, Nd, NF, and NC, respectively. At this time, the Abbe number vd and the partial dispersion ratio θgF are as follows.

$$Nd = (Nd-1)/(NF-NC),$$

$$\theta gF = (Ng-NF)/(NF-NC).$$

The left side of the equation (1) follows as.

$$\frac{X1 \times f_n1 + X2 \times f_n2 + \ldots}{f_n1 + f_n2 + \ldots}$$

The conditional equation (1) is for favorably correcting the lateral chromatic aberration.

If (ΣXi×fni)/(Σfni) exceeds the upper limit of the conditional equation (1), the number of the secondary spectra is increased so as to unfavorably increase the lateral chromatic aberration.

When the upper limit of the conditional equation (1) is reduced smaller than −0.0035, the number of the secondary spectra is further effectively suppressed, so that the lateral chromatic aberration can be favorably and easily corrected. In this embodiment, by satisfying the above-described conditional equation (1), the subject of the present invention can be solved. Although the component of lens which is satisfied conditional equations (2) to (9) described later or the other component features are not components indispensable to the present invention, it is useful when the zoom lens includes the components.

On both sides of the negative lens Gn1, positive lenses are joined, respectively.

Thereby, the power of the negative lens Gn1 is increased so as to favorably correct the longitudinal chromatic aberration while by the joined positive lenses, the spherical aberration is favorably corrected. When the Abbe number and the partial dispersion ratio of the material are vdpb and θgFpb, respectively, the positive lens Gpb satisfying the following equation is arranged on the reduction side of the negative lens Gn1:

$$\theta gFpb-(0.6438-0.001682\times dpb)>0.005 \quad (2).$$

By the positive lens Gpb satisfying the conditional equation (2), the lateral chromatic aberration is efficiently corrected.

When the Abbe number and the partial dispersion ratio of the material are vdna and θgFna, respectively, the negative lens Gna satisfying the following condition is arranged on the expansion side of the negative lens Gn1:

$$\theta gFna-(0.6438-0.001682\times vdna)>0.010 \quad (3).$$

By the negative lens Gna satisfying the conditional equation (3), the lateral chromatic aberration is efficiently corrected.

When the Abbe number and the partial dispersion ratio of the material are vdpa and θgFpa, respectively, the positive lens Gpa satisfying the following condition is joined to the negative lens Gna:

$$\theta gFpa-(0.6438-0.001682\times vdpa)<0.003 \quad (4).$$

At this time, when the effective diameter and the radius of curvature of the composition plane are Dpa and rpa, respectively, the following condition is satisfied:

$$Dpa/|rpa|>0.25 \quad (5).$$

By joining the positive lens Gpa satisfying the conditional equations (4) and (5) to the negative lens Gna, the lateral chromatic aberration is favorably corrected.

When the Abbe number and the partial dispersion ratio of the material are vdpa1 and θgFpa1, respectively, one or more positive lenses Gpa1, Gpa2 ... satisfying the following condition are arranged on the expansion side of the negative lens Gn1:

$$\theta gFpa1-(0.6438-0.001682\times vdpa1)<-0.003 \quad (6).$$

Using these positive lenses Gpa1, Gpa2 ... , the lateral chromatic aberration is satisfactorily corrected.

When the focal length at the wide-angle end and the focal length at the telephoto end of the entire system are fw and ft, respectively, the following condition is satisfied:

$$ft/fw>1.25 \quad (7).$$

By allowing the zoom ratio to satisfy the conditional equation (7), the high optical performance is easily obtained over the entire zooming range.

It is useful when the lower limit of the conditional equation (7) is 1.39, i.e., the zoom ratio is increased.

When at least one aspheric lens is used in the zoom lens according to the exemplary embodiments, various aberrations can be more favorably corrected.

As described above, according to the exemplary embodiments, even with the high zoom ratio, high field angle, and high aperture, a telecentric zoom lens capable of efficiently correcting the lateral chromatic aberration, the spherical aberration, and their changes accompanied by the zooming can be obtained.

The zoom lens according to the exemplary embodiments projects the original picture formed by a display unit on a projection plane (screen plane). In the zoom lens or the image projection apparatus at this time, when an optical element without refractive power, such as a prism, is arranged on the reduction side, the following configuration can be adopted.

When one or more optical elements substantially without refractive power (the focal length is 50 times or more, even 100 times or more, of the entire system focal length fw) are arranged on the reduction side of the zoom lens PL1-5, reference character j denotes the order of the one or more optical elements ranging from the expansion side to the reduction side.

At this time, when refractive indexes of F-ray and C-ray of the $j^{th}$ optical element material are NFj and NCj, respectively; the length of the $j^{th}$ optical element in the optical axial direction is Dj; and the entire system focal length at the wide-angle end is fw, the system can be configured so as to satisfy the following condition:

$$0.02<\{\Sigma(NFj-NCj)\times Dj\}/fw<0.15 \quad (8).$$

$\{\Sigma(NFj-NCj)\times Dj\}$ herein refers to $(NF1-NC1)\times D1+(NF2-NC2)\times D2+ \ldots$ .

The conditional equation (8) is a condition for reducing the generation of chromatic aberrations when an optical element without refractive power, such as a prism for use in color composition of a three-color panel, is arranged on the reduction side to the utmost. This optical element has an achromatic effect of the longitudinal chromatic aberration in the same way as in the negative lens in the compensation lens unit. The conditional equation (8) expresses the achromatic amount of the longitudinal chromatic aberration. If the conditional equation (8) is applied, the load to the compensation lens unit for the axial achromatism is alleviated so as to increase the degree of freedom in correction of the spherical aberration.

When the value of the conditional equation (8) is lower than the lower limit thereof, the correction of the longitudinal chromatic aberration is insufficient so as to reduce the degree of freedom in correcting the spherical aberration. Inversely, when the value is larger than the upper limit of the conditional equation (8), the longitudinal chromatic aberration is excessively corrected so as to reduce the degree of freedom in correcting the spherical aberration after all.

The prism for use in a conventional liquid crystal projector can use a glass material such as Optical Glass BK7 supplied by Schot Company. When this glass material is used, the conditional equation (8) is satisfied. It is further useful that the lower limit of the conditional equation (8) be 0.03 and/or the upper limit be 0.1, even 0.8.

The zoom lens according to the exemplary embodiments is telecentric on the reduction side. According to the present invention, the telecentric refers to the case where at least one of the following conditional equations (9) is satisfied:

$$0.3<|Dpw/L|$$

$$0.3<|Dpt/L| \quad (9),$$

where the distances at wide angle and telephoto ends between the conjugate plane on the reduction side (the image plane IP) and the pupil position on the reduction side are Dpw and Dpt, respectively, and the entire lens length (distance between the first lens plane and the final lens plane) is L. It is further useful herein that the lower limit of the conditional equations (9) be 1.0 and/or the upper limit be 5.0.

The features of the zoom lens according to the exemplary embodiments will be described with reference to the drawings.

FIRST EXEMPLARY EMBODIMENT

A six-unit zoom lens according to a first exemplary embodiment, as shown in FIGS. 1A and 1B, includes the first to sixth lens units L1a to L6a arranged in the order of negative, positive, positive, positive, negative, and positive refractive power from the expansion side toward the reduction side.

The configuration of each lens unit will be described below as being arranged from the expansion side to the reduction side.

The first lens unit L1a includes a meniscus negative lens G11a with a convex face on the expansion side, a negative lens G12a including an aspheric face, a negative lens G13a, and a meniscus positive lens G14a with the convex face on the reduction side.

The face on the reduction side, where the paraxial chief ray incident height hb is small, has negative refractive power for having a wider angle while the face on the expansion side, where the paraxial chief ray incident height hb is large, has positive refractive power for correcting the distortion.

The negative lenses G12a and G13a have strong refractive power for having a wider angle so as to effectively correct the distortion.

The positive lens G14a corrects various aberrations generated in the negative lenses G11a to G13a.

The second lens unit L2a includes a cemented lens between the bi-convex positive lens G21a and the meniscus negative lens G22a with the convex face on the reduction side.

The second lens unit L2a is a moving lens unit moving for zooming and has the strongest positive refractive power among four moving lens units. During the zooming, the composite focal length is largely changed by the movement of the second lens unit L2a. Namely, the main variable power of the entire system can be due to the movement of the second lens unit L2a.

The positive lens G21a and the negative lens G22a in the second lens unit L2a satisfy the conditional equations (4) and (3), respectively.

The cementing plane between the positive lens G21a and the negative lens G22a satisfies the conditional equation (5). When a glass material alleviating the secondary spectrum is used in the second lens unit L2a with the large paraxial chief ray incident height hb, the lateral chromatic aberration is efficiently corrected.

The third lens unit L3a includes the positive lens G31a satisfying the conditional equation (6). The third lens unit L3a is a moving lens unit moving for zooming and contributing to the variable power together with the second lens unit L2a that is the main variable power unit. The third lens unit L3a corrects the lateral chromatic aberration.

The fourth lens unit L4a includes the positive lens G41a. The fourth lens unit L4a compensates the aberration generated in the second lens unit L2a, the lateral chromatic aberration, and the longitudinal chromatic aberration.

The fifth lens unit L5a is a compensatory lens unit and includes a triplet cemented lens, in which on both sides of the negative lens G52a satisfy the conditional equation (1), the meniscus positive lenses G51a and G53a are bonded; the negative lens G54a including an aspheric plane; and the bi-convex positive lens G55a.

The fifth lens unit L5a is a moving lens unit moving for the zooming. While suppressing the generation of the lateral chromatic aberration with the triplet cemented lens, the fifth lens unit L5a satisfactorily corrects the spherical aberration and the longitudinal chromatic aberration. The lateral chromatic aberration in the entire zooming region and the field curvature are favorably corrected with the negative lens G54a and the positive lens G55.

The sixth lens unit L6a includes the positive lens G61a and has a function to reduce the composite refractive power combined with the first lens unit L1a to the fifth lens unit L5a. This is optically advantageous to increasing the field angle and the aperture.

The sixth lens unit L6a satisfies the conditional equation (2) and favorably corrects the lateral chromatic aberration.

The zoom ratio of the zoom lens according to the first exemplary embodiment is about 1.65. According to the first exemplary embodiment, as shown in FIGS. 2 and 3, excellent optical characteristics are exhibited at both the wide-angle and telephoto ends.

SECOND EXEMPLARY EMBODIMENT

A zoom lens according to a second exemplary embodiment is for use in a reflection-type projector, for example. In the zoom lens, as shown in FIGS. 4A and 4B, an optical block to be inserted into the reduction side of the final lens face has a large length. The zoom lens according to the second exemplary embodiment is a six-unit zoom lens which includes the first to sixth lens units L1b to L6b arranged in the order of negative, positive, positive, negative, positive, and positive refractive power from the expansion side toward the reduction side.

The configuration of the sixth lens unit L6b is the same as in the first exemplary embodiment.

The configuration and function of the first lens unit L1b are the same as in the first exemplary embodiment. In addition to those, according to the second exemplary embodiment, the negative lens G11b satisfies the conditional equation (3) so as to correct the lateral chromatic aberration simultaneously.

The second lens unit L2b includes the bi-convex positive lens G21b. The third lens unit L3b includes a meniscus positive lens with the convex face on the expansion side. The variation is executed by the second and third lens units.

The positive lens G21b of the second lens unit L2b satisfies the conditional equation (6) so as to efficiently correct the lateral chromatic aberration.

The fourth lens unit L4b is a cemented compensation lens unit between the negative lens G41b and the bi-convex positive lens G42b. The negative lens G41b satisfies the conditional equation (1) together with the negative lens G51b of the fifth lens unit L5b, which will be described later. The fourth lens unit L4b corrects the longitudinal chromatic aberration owing to the prism with a long block as well as it suppresses the generation of the lateral chromatic aberration. Thereby, the spherical aberration and the longitudinal chromatic aberration are favorably corrected.

The fifth lens unit L5b includes a cemented lens between the bi-concave negative lens G51b and the bi-convex positive lens G52b, and the bi-convex positive lens G53b.

The above-mentioned cemented lens has strong refractive power so as to help the compensation lens unit L4b while favorably correcting the lateral chromatic aberration and the distortion along the entire zooming region owing to each composition plane and the positive lens G53b.

The zoom ratio of the zoom lens according to the second exemplary embodiment is about 1.66. According to the second exemplary embodiment, as shown in FIGS. 5 and 6, excellent optical characteristics are exhibited at both the wide-angle and telephoto ends.

THIRD EXEMPLARY EMBODIMENT

A zoom lens according to a third exemplary embodiment, as shown in FIGS. 7A and 7B, is a five-unit zoom lens which includes the first to fifth lens units L1c to L5c arranged in the order of negative, positive, negative, positive, and positive refractive power from the expansion side toward the reduction side.

The second lens unit L2c according to the third exemplary embodiment has an integrated structure of the second lens unit L2c with the third lens unit L3c according to the first exemplary embodiment shown in FIGS. 1A and 1B. Thereby, the same effect as that of the first exemplary embodiment can be obtained.

The zoom ratio of the zoom lens according to the third exemplary embodiment is about 1.40. According to the third exemplary embodiment, as shown in FIGS. 8 and 9, excellent optical characteristics are exhibited at both the wide-angle and telephoto ends.

FOURTH EXEMPLARY EMBODIMENT

A zoom lens according to a fourth exemplary embodiment, as shown in FIGS. 11A and 10B, is a five-unit zoom lens which includes the first to fifth lens units L1d to L5d arranged in the order of negative, positive, positive, negative, and positive refractive power from the expansion side toward the reduction side.

The fourth lens unit L4d according to the fourth exemplary embodiment has an integrated structure of the fourth lens unit L4d with the fifth lens unit L5d according to the second exemplary embodiment shown in FIGS. 4A and 4B. Thereby, the same effect as that of the second exemplary embodiment can be obtained.

The zoom ratio of the zoom lens according to the fourth exemplary embodiment is about 1.48. According to the fourth exemplary embodiment, as shown in FIGS. 11 and 12, excellent optical characteristics are exhibited at both the wide-angle and telephoto ends.

FIFTH EXEMPLARY EMBODIMENT

A zoom lens according to a fifth exemplary embodiment, as shown in FIGS. 13A and 13B, is a four-unit zoom lens which includes the first to fourth lens units L1e to L4e arranged in the order of negative, positive, negative, and positive refractive power from the expansion side toward the reduction side.

The fifth exemplary embodiment is similar to the integrated structure of the third lens unit L3e with the fourth lens unit L4e according to the fourth exemplary embodiment shown in FIGS. 10A and 10B. Thereby, the same effect as that of the fourth exemplary embodiment can be obtained.

The zoom ratio of the zoom lens according to the fifth exemplary embodiment is about 1.29. According to the fifth exemplary embodiment, as shown in FIGS. 14 and 15, excellent optical characteristics are exhibited at both the wide-angle and telephoto ends.

Then, Table 1 shows the correspondence relationship between lenses constituting the lens units according to the exemplary embodiments and the above-mentioned negative lens Gn1, the positive lens Gpb, the negative lens Gna, the positive lens Gpa, and the positive lenses Gpa1, Gpa2 . . . .

According to the first to fifth exemplary embodiments, the negative lens Gn1, as shown in Table 1, includes the negative lens G52a-b, the negative lens G41a-e, the negative lens G42a-d, the negative lens G41a-e, and the negative lens G32a-e. Also, in the second exemplary embodiment, the negative lens Gn2 is the negative lens G51b; in the third exemplary embodiment, the negative lens Gn2 is the negative lens G43c; and in the fifth exemplary embodiment, the negative lens Gn2 is the negative lens G34e.

TABLE 1

| | | Exemplary embodiment | | | | | | | | |
|---|---|---|---|---|---|---|---|---|---|---|
| | | 1 | | 2 | | 3 | | 4 | | 5 |
| Negative lens | Gn1 | Negative lens | G52 | Negative lens | G41 | Negative lens | G42 | Negative lens | G41 | Negative lens | G32 |
| Positive lens | Gpb | Positive lens | G61 | Positive lens | G61 | — | | Positive lens | G51 | Positive lens | G41 |
| Negative lens | Gna | Negative lens | G22 | Negative lens | G11 | Negative lens | G21 | — | | — | |
| Positive lens | Gpa | Positive lens | G21 | — | | Positive lens | G22 | — | | — | |
| Positive lens | Gpa1 | Positive lens | G14 | Positive lens | G21 | Positive lens | G14 | Positive lens | G14 | Positive lens | G14 |
| Positive lens | Gpa2 | Positive lens | G31 | — | | Positive lens | G23 | Positive lens | G21 | Positive lens | G21 |

FIG. 16 is a schematic view of part of an image projection apparatus according to an exemplary embodiment of the present invention.

Referring to the drawing, the above-described zoom lens is incorporated in a three-plate color liquid crystal projector, in which a plurality of colored rays based on the image information from a plurality of liquid crystal panels are combined through color combining device 102, and the image projection apparatus expands the images by the zoom lens 103 so as to project them on a screen plate 104.

Referring to FIG. 16, a color liquid crystal projector 101 combines color rays R, G, and B from three-plate liquid crystal panels 105R, 105G, and 105B into one optical path with a prism 102 as color combining device. Then, using a projection lens 103 which includes the zoom lens described above, the combined images are projected on a screen 104.

As described above, the zoom lens according to the exemplary embodiments is suitable for a projector apparatus in that images of a display medium are enlarged so as to project them on a screen arranged at a definite distance.

The simple and telecentric zoom lens is especially suitable for the fine image projection on the screen through the zoom lens after respective color rays are combined using a plurality of the liquid crystal panels for each color ray as the display medium.

FIG. 17 is a schematic view of part of an image pickup apparatus according to an embodiment of the present invention. According to the exemplary embodiment, the above-described zoom lens is used in image pickup apparatuses 106 such as a video camera, a film camera, and a digital camera.

Referring to FIG. 17, images of an object 109 are focused on a photoreceptor 107 by a taking lens 108 so as to obtain image information.

As described above, according to the exemplary embodiments, the zoom lens suitable for a liquid crystal projector with satisfactory optical functions over the entire picture can be achieved by favorably correcting various aberrations involved with zooming as well as by miniaturizing the entire lens system.

In addition to these, the zoom lens can be achieved that is suitable for image pickup apparatuses, such as a video camera, a film camera, and a digital camera, for forming image information on a solid-state image pickup device (opto-electric transducer), such as a silver film, a CCD sensor, a CMOS sensor.

Numerical examples 1 to 5 corresponding to the zoom lenses according to the first to fifth exemplary embodiments, respectively, will be shown below. In the numerical examples, character i denotes the order of an optical face arranged from the expansion side (front side); ri represents the radius of curvature of the $i^{th}$ optical face (the $i^{th}$ face); and di the space between the $i^{th}$ face and the $(i+1)_{th}$ face. The unit of ri and di is mm. Characters ni and vi represent the refractive index and the Abbe number of the $i^{th}$ optical element expressed in the standard d-ray, respectively; characters fw and ft the focal length at the wide-angle end and the focal length at the telephoto end, respectively; and character Fno the F number.

When reference character k denotes a conic constant; characters A, B, C, D, and E respective aspheric factors; and x the displacement in the optical axial direction at a position where the height from the optical axis is h, expressed by the face apex reference, an aspheric shape is expressed as follows:

$$X=(h^2/r)/[1+[1-(1+k)(h/R)^2]^{1/2}]+Ah^2+Bh^6+Ch^8+Dh^{10}+Eh^{12},$$

where r denotes the paraxial radius of curvature.

For example, the expression "e−Z" refers to "$10^{-Z}$".

The relationship between the lens configurations, the conditional equations 1 to 8, and the numerals of the numerical examples 1 to 5 is shown in Tables 2 and 3.

NUMERICAL EXAMPLE 1

| | fw: 19.42 ft: 32.05 Fno: 1.75~2.64 | | | | |
|---|---|---|---|---|---|
| | Radius of curvature: r | Face space: d | Refractive index: Nd | Abbe number: vd | Anomalous dispersion amount |
| Screen | | 1760.00 | | | |
| 1 | 72.03 | 2.80 | 1.51633 | 64.1 | −0.0007 |
| 2 | 26.57 | 7.60 | | | |
| 3(✕) | 116.21 | 4.00 | 1.52996 | 55.8 | — |
| 4(✕) | 28.40 | 15.47 | | | |
| 5 | −28.59 | 2.00 | 1.61272 | 58.7 | −0.0002 |
| 6 | 210.52 | 1.31 | | | |
| 7 | −706.97 | 4.99 | 1.83400 | 37.2 | −0.0037 |
| 8 | −49.69 | (Variable) | | | |
| 9 | 283.64 | 8.03 | 1.74950 | 35.3 | 0.0024 |
| 10 | −35.36 | 2.00 | 1.80518 | 25.4 | 0.0151 |
| 11 | −137.29 | (Variable) | | | |
| 12 | 44.41 | 5.09 | 1.69680 | 55.5 | −0.0070 |
| 13 | 680.82 | 10.00 | | | |
| 14(STO) | | (Variable) | | | |
| 15 | 53.89 | 2.32 | 1.48749 | 70.2 | 0.0043 |
| 16 | 250.69 | (Variable) | | | |
| 17 | −41.36 | 2.78 | 1.60311 | 60.6 | |
| 18 | −19.12 | 1.20 | 1.83400 | 37.2 | −0.0037 |
| 19 | 25.82 | 5.04 | 1.48749 | 70.2 | 0.0043 |
| 20 | −60.72 | 3.88 | | | |
| 21(✕) | −209.20 | 3.50 | 1.52996 | 55.8 | — |
| 22(✕) | −128.51 | 0.50 | | | |
| 23 | 230.90 | 7.57 | 1.60311 | 60.6 | −0.0003 |
| 24 | −31.72 | (Variable) | | | |
| 25 | 116.77 | 4.46 | 1.61272 | 58.7 | −0.0002 |
| 26 | −105.28 | 2.00 | | | |
| Prism | | 31.34 | 1.51633 | 64.1 | −0.0007 |

Anomalous dispersion amount = θ gF − (0.6438 − 0.001682 × vd)
(✕)Aspheric surface -continued

| | Face space | |
|---|---|---|
| Face NO. | Wide-angle end | Telephoto end |
| 8 | 25.07 | 1.33 |
| 11 | 0.70 | 0.70 |
| 14 | 24.22 | 0.67 |
| 16 | 2.87 | 25.22 |
| 24 | 0.60 | 25.23 |

| | | Aspheric factor | | | |
|---|---|---|---|---|---|
| Face NO. | K | A | B | C | D | E |
| 3 | 0.000E+00 | 1.567E−05 | −3.486E−08 | 1.005E−10 | −1.441E−13 | 1.235E−16 |
| 4 | 0.000E+00 | 8.840E−06 | −5.126E−08 | 1.695E−10 | −3.432E−13 | 4.314E−16 |
| 21 | 0.000E+00 | −1.434E−05 | −4.971E−08 | 5.175E−10 | −2.528E−12 | 5.126E−15 |
| 22 | 0.000E+00 | −8.967E−06 | −3.292E−08 | 2.392E−10 | −9.261E−13 | 1.463E−15 |

NUMERICAL EXAMPLE 2

| | fw: 16.72 ft: 27.75 Fno: 1.85~2.56 | | | |
|---|---|---|---|---|
| | Radius of curvature: r | Face space: d | Refractive index: Nd | Abbe number: νd | Anomalous dispersion amount |
| Screen | | 2100.00 | | | |
| 1 | 33.78 | 2.00 | 1.76182 | 26.5 | 0.0144 |
| 2 | 19.58 | 6.48 | | | |
| 3(X) | 50.00 | 3.50 | 1.52996 | 55.8 | — |
| 4(X) | 22.22 | 13.88 | | | |
| 5 | −18.90 | 1.60 | 1.48749 | 70.2 | 0.0043 |
| 6 | 133.27 | 3.18 | | | |
| 7 | −328.03 | 4.98 | 1.74950 | 35.3 | 0.0024 |
| 8 | −33.53 | (Variable) | | | |
| 9 | 79.15 | 2.72 | 1.80610 | 40.9 | −0.0049 |
| 10 | −731.69 | 26.80 | | | |
| 11(STO) | | (Variable) | | | |
| 12 | 33.21 | 3.28 | 1.51823 | 58.9 | 0.0001 |
| 13 | 139.01 | (Variable) | | | |
| 14 | 84.81 | 1.00 | 1.83400 | 37.2 | −0.0037 |
| 15 | 19.47 | 5.59 | 1.48749 | 70.2 | 0.0043 |
| 16 | −58.04 | (Variable) | | | |
| 17 | −24.37 | 1.10 | 1.83400 | 37.2 | −0.0037 |
| 18 | 41.80 | 5.08 | 1.48749 | 70.2 | 0.0043 |
| 19 | −36.45 | 0.15 | | | |
| 20 | 68.16 | 7.36 | 1.48749 | 70.2 | 0.0043 |
| 21 | −28.08 | (Variable) | | | |
| 22 | 144.44 | 2.54 | 1.80518 | 25.4 | 0.0151 |
| 23 | −155.62 | 2.00 | | | |
| Prism 1 | | 23.61 | 1.51633 | 64.1 | −0.0007 |
| Prism 2 | | 18.00 | 1.80518 | 25.4 | 0.0151 |

Anomalous dispersion amount = θ gF − (0.6438 − 0.001682 × νd)
(X)Aspheric surface

| | Face space | |
|---|---|---|
| Face NO. | Wide-angle end | Telephoto end |
| 8 | 22.92 | 0.70 |
| 11 | 16.84 | 0.15 |
| 13 | 11.00 | 22.60 |
| 16 | 2.41 | 8.34 |
| 21 | 0.60 | 21.97 |

| | | Aspheric factor | | | |
|---|---|---|---|---|---|
| Face NO. | K | A | B | C | D | E |
| 3 | −8.653E−01 | 3.627E−06 | −9.429E−09 | 2.756E−10 | −8.304E−13 | 1.651E−15 |
| 4 | −4.329E+00 | 2.856E−05 | −1.581E−07 | 6.595E−10 | −1.290E−12 | 6.999E−16 |

NUMERICAL EXAMPLE 3 fw: 19.42
ft: 27.18
Fno: 1.75~2.65

| | Radius of curvature: r | Face space: d | Refractive index: Nd | Abbe number: νd | Anomalous dispersion amount |
|---|---|---|---|---|---|
| Screen | | 1760.00 | | | |
| 1 | 57.28 | 2.80 | 1.60311 | 60.6 | −0.0003 |
| 2 | 26.32 | 6.86 | | | |
| 3(X) | 85.88 | 4.00 | 1.52996 | 55.8 | — |
| 4(X) | 26.00 | 15.17 | | | |
| 5 | −31.67 | 2.00 | 1.60311 | 60.6 | −0.0003 |
| 6 | 95.56 | 1.47 | | | |
| 7 | 302.88 | 4.91 | 1.83400 | 37.2 | −0.0037 |
| 8 | −65.49 | (Variable) | | | |
| 9 | −511.25 | 2.00 | 1.80518 | 25.4 | 0.0151 |
| 10 | 41.91 | 8.86 | 1.74950 | 35.3 | 0.0024 |
| 11 | −94.53 | 0.15 | | | |
| 12 | 41.62 | 5.53 | 1.77250 | 49.6 | −0.0084 |
| 13 | 553.88 | 10.00 | | | |
| 14(STO) | | (Variable) | | | |
| 15 | 65.36 | 1.96 | 1.48749 | 70.2 | 0.0043 |
| 16 | −11844.44 | (Variable) | | | |
| 17 | −30.32 | 2.84 | 1.60311 | 60.6 | −0.0003 |
| 18 | −16.87 | 1.20 | 1.83400 | 37.2 | −0.0037 |
| 19 | 31.24 | 5.49 | 1.48749 | 70.2 | 0.0043 |
| 20 | −38.72 | 2.78 | | | |
| 21(X) | −80.94 | 3.50 | 1.52996 | 55.8 | — |
| 22(X) | −68.00 | 0.50 | | | |
| 23 | 329.52 | 7.96 | 1.60311 | 60.6 | −0.0003 |
| 24 | −29.63 | (Variable) | | | |
| 25 | 81.12 | 5.05 | 1.48749 | 70.2 | 0.0043 |
| 26 | −112.06 | 2.00 | | | |
| Prism | | 31.34 | 1.51633 | 64.1 | −0.0007 |

Anomalous dispersion amount = θ gF − (0.6438 − 0.001682 × νd)
(X)Aspheric surface

| | Face space | |
|---|---|---|
| Face NO. | Wide-angle end | Telephoto end |
| 8 | 17.90 | 2.21 |
| 14 | 25.01 | 9.43 |
| 16 | 2.99 | 19.36 |
| 24 | 0.60 | 15.50 |

| | Aspheric factor | | | | | |
|---|---|---|---|---|---|---|
| Face NO. | K | A | B | C | D | E |
| 3 | 0.000E+00 | 1.641E−05 | −3.528E−08 | 1.022E−10 | −1.518E−13 | 1.294E−16 |
| 4 | 0.000E+00 | 1.010E−05 | −4.988E−08 | 1.667E−10 | −3.810E−13 | 5.116E−16 |
| 21 | 0.000E+00 | −1.678E−05 | −5.448E−08 | 5.140E−10 | −2.627E−12 | 5.195E−15 |
| 22 | 0.000E−00 | −9.868E−06 | −2.984E−08 | 2.018E−10 | −7.819E−13 | 1.176E−15 |

NUMERICAL EXAMPLE 4 fw: 16.76
ft: 24.74
Fno: 1.85~2.32

| | Radius of curvature: r | Face space: d | Refractive index: Nd | Abbe number: νd | Anomalous dispersion amount |
|---|---|---|---|---|---|
| Screen | | 2100.00 | | | |
| 1 | 38.63 | 2.20 | 1.51633 | 64.1 | −0.0007 |
| 2 | 22.48 | 6.32 | | | |
| 3(X) | 50.00 | 3.50 | 1.52996 | 55.8 | — |
| 4(X) | 24.28 | 11.66 | | | |
| 5 | −29.44 | 1.60 | 1.60738 | 56.8 | 0.0001 |

-continued

| | | | | | |
|---|---|---|---|---|---|
| 6 | 54.58 | 8.97 | | | |
| 7 | −2051.09 | 5.69 | 1.83400 | 37.2 | −0.0037 |
| 8 | −44.89 | (Variable) | | | |
| 9 | 54.01 | 3.69 | 1.72000 | 50.2 | −0.0073 |
| 10 | −1708.06 | 21.79 | | | |
| 11(STO) | | (Variable) | | | |
| 12 | 61.33 | 3.29 | 1.48749 | 70.2 | 0.0043 |
| 13 | −43.03 | (Variable) | | | |
| 14 | −34.47 | 1.00 | 1.83400 | 37.2 | −0.0037 |
| 15 | 26.44 | 5.27 | 1.48749 | 70.2 | 0.0043 |
| 16 | −25.66 | 2.47 | | | |
| 17 | −19.93 | 1.10 | 1.83400 | 37.2 | −0.0037 |
| 18 | 116.35 | 4.47 | 1.48749 | 70.2 | 0.0043 |
| 19 | −25.09 | 3.79 | | | |
| 20 | 273.67 | 6.24 | 1.48749 | 70.2 | 0.0043 |
| 21 | −26.29 | (Variable) | | | |
| 22 | 64.01 | 2.95 | 1.80518 | 25.4 | 0.0151 |
| 23 | −725.84 | 2.00 | | | |
| Prism | | 23.61 | 1.51633 | 64.1 | −0.0007 |
| Prism | | 18.00 | 1.80518 | 25.4 | 0.0151 |

Anomalous dispersion amount = $\theta gF - (0.6438 - 0.001682 \times \nu d)$
(✗)Aspheric surface Face space

| Face NO. | Wide-angle end | Telephoto end |
|---|---|---|
| 8 | 34.91 | 4.45 |
| 11 | 16.29 | 23.67 |
| 13 | 1.68 | 5.33 |
| 21 | 1.12 | 20.56 |

Aspheric factor

| Face NO. | K | A | B | C | D | E |
|---|---|---|---|---|---|---|
| 3 | −8.653E−01 | 1.511E−05 | −6.228E−08 | 3.545E−10 | −9.188E−13 | 1.142E−15 |
| 4 | −4.329E+00 | 4.279E−05 | −1.871E−07 | 8.660E−10 | −2.519E−12 | 3.378E−15 |

NUMERICAL EXAMPLE 5 fw: 16.75
ft: 21.61
Fno: 1.85~2.08

| | Radius of curvature: r | Face space: d | Refractive index: Nd | Abbe number: νd | Anomalous dispersion amount |
|---|---|---|---|---|---|
| Screen | | 2100.00 | | | |
| 1 | 37.36 | 2.20 | 1.51633 | 64.1 | −0.0007 |
| 2 | 21.70 | 6.25 | | | |
| 3(✗) | 50.00 | 3.50 | 1.52996 | 55.8 | — |
| 4(✗) | 24.58 | 10.71 | | | |
| 5 | −32.42 | 1.60 | 1.60738 | 56.8 | 0.0001 |
| 6 | 51.67 | 9.07 | | | |
| 7 | 529.23 | 4.90 | 1.83400 | 37.2 | −0.0037 |
| 8 | −47.07 | (Variable) | | | |
| 9 | 43.74 | 3.47 | 1.72000 | 50.2 | −0.0073 |
| 10 | 785.46 | 3.29 | | | |
| 11(STO) | | (Variable) | | | |
| 12 | 76.01 | 3.27 | 1.48749 | 70.2 | 0.0043 |
| 13 | −40.22 | 1.71 | | | |
| 14 | −32.34 | 1.00 | 1.83400 | 37.2 | −0.0037 |
| 15 | 22.14 | 6.09 | 1.48749 | 70.2 | 0.0043 |
| 16 | −24.67 | 2.62 | | | |
| 17 | −19.52 | 1.10 | 1.83400 | 37.2 | −0.0037 |
| 18 | 171.95 | 4.62 | 1.48749 | 70.2 | 0.0043 |
| 19 | −29.05 | 0.78 | | | |
| 20 | 191.05 | 7.54 | 1.48749 | 70.2 | 0.0043 |
| 21 | −25.16 | (Variable) | | | |
| 22 | 69.62 | 3.13 | 1.80518 | 25.4 | 0.0151 |

-continued

| | | | | | |
|---|---|---|---|---|---|
| 23 | −319.42 | 2.00 | | | |
| Prism 1 | | 23.61 | 1.51633 | 64.1 | −0.0007 |
| Prism 2 | | 18.00 | 1.80518 | 25.4 | 0.0151 |

Anomalous dispersion amount = $\theta gF - (0.6438 - 0.001682 \times vd)$
(✗)Aspheric surface

| | Face space | |
|---|---|---|
| Face NO. | Wide-angle end | Telephoto end |
| 8 | 50.10 | 30.71 |
| 11 | 22.45 | 28.51 |
| 21 | 0.60 | 13.72 |

| | Aspheric factor | | | | | |
|---|---|---|---|---|---|---|
| Face NO. | K | A | B | C | D | E |
| 3 | −8.653E−01 | 1.968E−05 | −7.936E−08 | 4.302E−10 | −1.138E−12 | 4.867E−15 |
| 4 | −4.329E+00 | 4.846E−05 | −2.161E−07 | 1.102E−09 | −3.507E−12 | 4.867E−15 |

TABLE 2

| | Exemplary embodiment | | | | |
|---|---|---|---|---|---|
| Conditional equation | 1 | 2 | 3 | 4 | 5 |
| (1) | −0.0037 | −0.0037 | −0.0037 | −0.0037 | −0.0037 |
| (2) | — | 0.0151 | — | 0.0151 | 0.0151 |
| (3) | 0.0151 | 0.0144 | 0.0151 | — | — |
| (4) | 0.0024 | — | 0.0024 | — | — |
| (5) Dpa/\|rpa\| | 0.551 | — | 0.465 | — | — |
| (6) | −0.0037 | −0.0049 | −0.0037 | −0.0073 | −0.0073 |
| (7) ft/fw | 1.65 | 1.66 | 1.40 | 1.48 | 1.29 |
| (8) | — | 0.045 | — | 0.045 | 0.045 |
| (9) | 0.448 | 3.678 | 0.317 | 1.241 | 1.906 |

Using the zoom lens according to the exemplary embodiments described above, various aberrations involved with zooming can be satisfactorily corrected (reduced). When this zoom lens is incorporated in an image projection apparatus, excellent images can be projected over the entire picture.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-046646 filed Feb. 23, 2006, which is hereby incorporated by reference herein in its entirety.

What is claimed is:

1. A zoom lens comprising:
a plurality of lens units,
wherein the plurality of lens units have at least one negative lens, including a first negative lens Gn1 arranged at a position where an effective diameter is minimized among negative lenses of the zoom lens,
wherein when the at least one negative lens is represented by an $i^{th}$ negative lens Gni indicating the $i^{th}$ negative lens from an expansion side toward the reduction side and $Xi=\theta gFni-(0.6438-0.001682 \times vdni)$, the following condition is satisfied:

$(\Sigma Xi \times fni)/(\Sigma fni) < -0.003,$ where the Abbe number and the partial dispersion ratio of the material of the $i^{th}$ negative lens Gni are vdni and θgFni, respectively, and the focal length of the $i^{th}$ negative lens Gni is fni.

2. The zoom lens according to claim 1, wherein the first negative lens Gn1 is provided with positive lenses cemented on the expansion and reduction sides of the first negative lens Gn1, respectively.

3. The zoom lens according to claim 1, further comprising a positive lens arranged on the reduction side of the first negative lens Gn1 and satisfying the following condition:

$\theta gFpb-(0.6438-0.001682 \times dpb) > 0.005,$ where the Abbe number and the partial dispersion ratio of the material are vdpb and θgFpb, respectively.

4. The zoom lens according to claim 1, further comprising a negative lens Gna arranged on the expansion side of the first negative lens Gn1 and satisfying the following condition:

$\theta gFna-(0.6438-0.001682 \times vdna) > 0.010,$ where the Abbe number and the partial dispersion ratio of the material are vdna and θgFna, respectively.

5. The zoom lens according to claim 4, wherein a positive lens Gpa is cemented to the negative lens Gna so as to satisfy the following conditions:

$\theta gFpa-(0.6438-0.001682 \times vdpa) < 0.003,$ $Dpa/|rpa| > 0.25,$ where the Abbe number and the partial dispersion ratio of the material of the positive lens Gpa are vdpa and θgFpa, respectively, and the effective diameter and the radius of curvature of the composition plane are Dpa and rpa, respectively.

6. The zoom lens according to claim 1, further comprising at least one positive lens arranged on the expansion side of the first negative lens Gn1 and satisfying the following condition:

$\theta gFpa1-(0.6438-0.001682 \times vdpa1) < -0.003,$ where the Abbe number and the partial dispersion ratio of the material are vdpa1 and θgFpa1, respectively.

7. The zoom lens according to claim 1, wherein the zoom lens satisfies the following condition:

$ft/fw > 1.25,$ where the focal length at the wide-angle end and the focal length at the telephoto end of the entire system are fw and ft, respectively.

8. The zoom lens according to claim 1, wherein the plurality of lens units include a first lens unit with negative refractive power, a second lens unit with positive refractive power, a third lens unit with positive refractive power, a fourth lens unit with positive refractive power, a fifth lens unit with negative refractive power, and a sixth lens unit with positive refractive power arranged from the expansion side toward the reduction side in that order, wherein the first and sixth lens units are immovable for zooming, and the second to fifth lens units are moved toward the expansion side during the zooming from the wide-angle end to the telephoto end, and wherein the negative lens Gn1 is included in the fifth lens unit.

9. The zoom lens according to claim 1, wherein the plurality of lens units include a first lens unit with negative refractive power, a second lens unit with positive refractive power, a third lens unit with positive refractive power, a fourth lens unit with negative refractive power, a fifth lens unit with positive refractive power, and a sixth lens unit with positive refractive power arranged from the expansion side toward the reduction side in that order, wherein the first and sixth lens units are immovable for zooming, and the second to fifth lens units are moved toward the expansion side during the zooming from the wide-angle end to the telephoto end, and wherein the negative lens Gn1 is included in the fourth lens unit.

10. The zoom lens according to claim 1, wherein the plurality of lens units include a first lens unit with negative refractive power, a second lens unit with positive refractive power, a third lens unit with negative refractive power, a fourth lens unit with positive refractive power, and a fifth lens unit with positive refractive power arranged from the expansion side toward the reduction side in that order, wherein the first and fifth lens units are immovable for zooming, and the second to fourth lens units are moved toward the expansion side during the zooming from the wide-angle end to the telephoto end, and wherein the negative lens Gn1 is included in the fourth lens unit.

11. The zoom lens according to claim 1, wherein the plurality of lens units include a first lens unit with negative refractive power, a second lens unit with positive refractive power, a third lens unit with negative refractive power, and a fourth lens unit with positive refractive power arranged from the expansion side toward the reduction side in that order, wherein the first and fourth lens units are immovable for zooming, and the second and third lens units are moved toward the expansion side during the zooming from the wide-angle end to the telephoto end, and wherein the negative lens Gn1 is included in the third lens unit.

12. The zoom lens according to claim 1, further comprising at least one optical element substantially without refractive power and arranged on the reduction side of the plurality of lens units, wherein when reference character j indicates the order of the at least one optical element arranged from the expansion side toward the reduction side, the zoom lens satisfies the following equation:

$$0.02 < \{\Sigma(NFj - NCj) \times Dj\}/fw < 0.15,$$

where refractive indexes of F-ray and C-ray of the $j^{th}$ optical element material are NFj and NCj, respectively, the length of the $j^{th}$ optical element in the optical axial direction is Dj, and the entire system focal length at the wide-angle end is fw.

13. An image projection apparatus, comprising:
a display unit configured to form an original picture; and
a zoom lens configured to project the original picture formed by the display unit on a plane to be projected,
wherein the zoom lens, being substantially telecentric on a reduction side, includes a plurality of lens units, wherein the plurality of lens units includes at least one negative lens including a first negative lens Gn1 arranged at a position where an effective diameter is minimized among negative lenses of the zoom lens, wherein when the at least one negative lens is represented by an $i^{th}$ negative lens Gni indicating the $i^{th}$ negative lens from an expansion side toward the reduction side and Xi=θgFni−(0.6438−0.001682×vdni), the following condition is satisfied:

$$(\Sigma Xi \times fni)/(\Sigma fni) < -0.003,$$

where the Abbe number and the partial dispersion ratio of the material of the $i^{th}$ negative lens Gni are vdni and θgFni, respectively, and the focal length of the $i^{th}$ negative lens Gni is fni.

14. An image projection apparatus, comprising:
a display unit configured to form an original picture; and
a zoom lens configured to project the original picture formed by the display unit on a plane to be projected,
wherein at least one optical element, being substantially without refractive power, is arranged on a reduction side of the zoom lens, and
wherein when reference character j indicates the order of the at least one optical element arranged from an expansion side toward the reduction side, the zoom lens satisfies the following equation:

$$0.02 < \{\Sigma(NFj - NCj) \times Dj\}/fw < 0.15,$$

where refractive indexes of F-ray and C-ray of the $j^{th}$ optical element material are NFj and NCj, respectively, the length of the $j^{th}$ optical element in the optical axial direction is Dj, and the entire system focal length at the wide-angle end is fw.

15. An image pickup apparatus, comprising:
a solid-state image pickup device; and
a zoom lens configured to focus an object image on the solid-state image pickup device,
wherein the zoom lens, being substantially telecentric on a reduction side, includes a plurality of lens units, wherein the plurality of lens units includes at least one negative lens including a first negative lens Gn1 arranged at a position where an effective diameter is minimized among negative lenses of the zoom lens, wherein when the at least one negative lens is represented by an $i^{th}$ negative lens Gni indicating the $i^{th}$ negative lens from an expansion side toward the reduction side and Xi=θgFni−(0.6438−0.001682×vdni), the following condition is satisfied:

$$(\Sigma Xi \times fni)/(\Sigma fni) < -0.003,$$

where the Abbe number and the partial dispersion ratio of the material of the $i^{th}$ negative lens Gni are vdni and θgFni, respectively, and the focal length of the $i^{th}$ negative lens Gni is fni.

* * * * *